(12) United States Patent
Donnenfeld

(10) Patent No.: US 11,010,596 B2
(45) Date of Patent: May 18, 2021

(54) APPARATUS AND METHODS FOR FACIAL RECOGNITION SYSTEMS TO IDENTIFY PROXIMITY-BASED CONNECTIONS

(71) Applicant: 15 Seconds of Fame, Inc., Santa Monica, CA (US)

(72) Inventor: Gregg Donnenfeld, Roslyn, NY (US)

(73) Assignee: 15 SECONDS OF FAME, INC., Santa Monica, CA (US)

( * ) Notice: Subject to any disclaimer, the term of this patent is extended or adjusted under 35 U.S.C. 154(b) by 251 days.

(21) Appl. No.: 16/295,509

(22) Filed: Mar. 7, 2019

(65) Prior Publication Data
US 2020/0285839 A1    Sep. 10, 2020

(51) Int. Cl.
| | | |
|---|---|---|
| *G06K 9/00* | (2006.01) | |
| *G06F 16/587* | (2019.01) | |
| *G06F 16/535* | (2019.01) | |
| *G06Q 10/02* | (2012.01) | |
| *G06Q 50/00* | (2012.01) | |
| *H04L 9/32* | (2006.01) | |

(52) U.S. Cl.
CPC ....... *G06K 9/00288* (2013.01); *G06F 16/535* (2019.01); *G06F 16/587* (2019.01); *G06Q 10/02* (2013.01); *G06Q 50/01* (2013.01); *H04L 9/3231* (2013.01)

(58) Field of Classification Search
CPC . G06K 9/00288; G06F 16/587; G06F 16/535; G06Q 10/02; G06Q 50/01; H04L 9/3231
USPC ......................................................... 382/118
See application file for complete search history.

(56) References Cited

U.S. PATENT DOCUMENTS

| | | |
|---|---|---|
| 5,144,685 A | 9/1992 | Nasar et al. |
| 6,142,876 A | 11/2000 | Cumbers |
| | (Continued) | |

FOREIGN PATENT DOCUMENTS

| | | |
|---|---|---|
| JP | 2003-317100 | 11/2003 |
| JP | 2010-009389 | 1/2010 |
| | (Continued) | |

OTHER PUBLICATIONS

Office Action issued by the Japanese Patent Office for Application No. 2018-520402, dated Jun. 10, 2020, 7 pages including English translation.

(Continued)

*Primary Examiner* — Jonathan S Lee
(74) *Attorney, Agent, or Firm* — Carlson, Gaskey & Olds

(57) ABSTRACT

An apparatus includes processor in communication with a memory and a communication interface. The processor is configured to receive, via a network and the communication interface, at least one image and to analyze the at least one image via facial recognition to define an analyzed data set. The processor is configured to (1) identify a user based on data included in user profile data structure, (2) identify a set of people connected to the user based on user connection data from at least one connection database, (3) compare the analyzed data set to facial image data of a person connected to the user, and (4) define a confidence level based on the comparison. When the confidence level satisfies a criterion, the processor can send to a client device a signal indicative of a notification that the person is within a predetermined proximity of the user.

27 Claims, 4 Drawing Sheets

(56) References Cited

U.S. PATENT DOCUMENTS

| | | |
|---|---|---|
| 6,532,345 B1 | 3/2003 | Gluck |
| 6,591,068 B1 | 7/2003 | Dietz |
| 6,745,186 B1 | 6/2004 | Testa et al. |
| 6,819,783 B2 | 11/2004 | Goldberg et al. |
| 7,023,367 B1 | 4/2006 | Manganaro |
| 7,035,440 B2 | 4/2006 | Kaku |
| 7,260,587 B2 | 8/2007 | Testa et al. |
| 7,330,875 B1 | 2/2008 | Parasnis et al. |
| 7,376,276 B2 | 5/2008 | Shniberg et al. |
| 7,391,886 B1 | 5/2008 | Clark et al. |
| 7,472,134 B2 | 12/2008 | Kaku |
| 7,494,061 B2 | 2/2009 | Reinhold |
| 7,526,106 B1 | 4/2009 | Clark et al. |
| 7,532,811 B2 | 5/2009 | Sauder |
| 7,552,228 B2 | 6/2009 | Parasnis et al. |
| 7,561,723 B2 | 7/2009 | Goldberg et al. |
| 7,619,660 B2 | 11/2009 | Grosvenor |
| 7,684,651 B2 | 3/2010 | Tang et al. |
| 7,783,085 B2 | 8/2010 | Perlmutter et al. |
| 7,800,646 B2 | 9/2010 | Martin |
| 7,860,347 B2 | 12/2010 | Tang et al. |
| 7,881,968 B2 | 2/2011 | David |
| 7,907,755 B1 | 3/2011 | Perlmutter et al. |
| 7,953,690 B2 | 5/2011 | Luo et al. |
| 7,965,908 B2 | 6/2011 | Hayashi |
| 7,966,223 B2 | 6/2011 | David |
| 7,995,806 B2 | 8/2011 | Goh et al. |
| 8,014,572 B2 | 9/2011 | Xiao et al. |
| 8,055,029 B2 | 11/2011 | Petrescu et al. |
| 8,144,944 B2 | 3/2012 | Ishii |
| 8,189,880 B2 | 5/2012 | Wen et al. |
| 8,204,437 B1 | 6/2012 | Rothschild |
| 8,233,679 B2 | 7/2012 | Perlmutter et al. |
| 8,254,699 B1 | 8/2012 | Zhao et al. |
| 8,260,674 B2 | 9/2012 | David |
| 8,279,323 B2 | 10/2012 | Ishii |
| 8,284,990 B2 | 10/2012 | Ma et al. |
| 8,306,284 B2 | 11/2012 | Goldberg et al. |
| 8,315,463 B2 | 11/2012 | Gallagher et al. |
| 8,325,999 B2 | 12/2012 | Kapoor et al. |
| 8,341,145 B2 | 12/2012 | Dodson et al. |
| 8,392,957 B2 | 3/2013 | Holt et al. |
| 8,406,481 B2 | 3/2013 | Goldberg |
| 8,422,739 B2 | 4/2013 | Ianculescu et al. |
| 8,560,625 B1 | 10/2013 | Hardman et al. |
| 8,630,956 B2 | 1/2014 | Arisawa et al. |
| 8,723,962 B2 | 5/2014 | Herring et al. |
| 8,782,709 B2 | 7/2014 | Wang et al. |
| 8,799,277 B2 | 8/2014 | Park et al. |
| 8,825,872 B2 | 9/2014 | Reisman |
| 8,831,275 B2 | 9/2014 | Goldberg |
| 8,885,960 B2 | 11/2014 | Sauve et al. |
| 8,898,464 B2 | 11/2014 | Bono et al. |
| 8,928,760 B2 | 1/2015 | Schultz et al. |
| 8,942,533 B2 | 1/2015 | Wiklof |
| 8,949,619 B2 | 2/2015 | Parry et al. |
| 8,957,981 B2 | 2/2015 | Fredlund et al. |
| 9,007,420 B1 | 4/2015 | Passe |
| 9,008,724 B2 | 4/2015 | Lord |
| 9,104,907 B2 | 8/2015 | Whitehill et al. |
| 9,131,147 B2* | 9/2015 | Quarfordt ............... H04L 67/18 |
| 9,189,682 B2 | 11/2015 | Salvador et al. |
| 9,213,885 B1 | 12/2015 | Schneiderman |
| 9,317,530 B2 | 4/2016 | Papakipos et al. |
| 9,386,180 B2 | 7/2016 | Oki |
| 9,396,354 B1 | 7/2016 | Murphy et al. |
| 9,420,315 B2 | 8/2016 | Melanson |
| 9,531,998 B1 | 12/2016 | Farrell et al. |
| 9,652,663 B2 | 5/2017 | Lau et al. |
| 9,668,002 B1 | 5/2017 | Baron et al. |
| 9,712,800 B2 | 7/2017 | St. Clair |
| 9,723,334 B2 | 8/2017 | Melanson |
| 9,852,364 B2 | 12/2017 | Liu et al. |
| 9,967,596 B2 | 5/2018 | Melanson |
| 9,979,800 B2* | 5/2018 | Berookhim ............ H04W 8/18 |
| 10,019,136 B1 | 7/2018 | Ozog |
| 10,027,726 B1 | 7/2018 | Ozog |
| 10,027,727 B1 | 7/2018 | Ozog |
| 10,094,655 B2 | 10/2018 | Sabitov et al. |
| 10,121,061 B2 | 11/2018 | Dickinson et al. |
| 10,339,925 B1* | 7/2019 | Rastrow ............... H04L 67/306 |
| 10,591,281 B2 | 3/2020 | Sabitov et al. |
| 10,654,942 B2* | 5/2020 | Resnick ................. C07K 16/18 |
| 10,832,310 B2* | 11/2020 | Isaacson ................ H04L 63/06 |
| 2003/0023452 A1 | 1/2003 | Novais et al. |
| 2003/0086123 A1 | 5/2003 | Torrens-Burton |
| 2003/0118216 A1 | 6/2003 | Goldberg |
| 2004/0008872 A1 | 1/2004 | Goldberg |
| 2004/0156535 A1 | 8/2004 | Goldberg et al. |
| 2005/0117022 A1 | 6/2005 | Marchant |
| 2005/0254505 A1 | 11/2005 | Chang et al. |
| 2005/0283497 A1 | 12/2005 | Nurminen et al. |
| 2006/0020630 A1 | 1/2006 | Stager et al. |
| 2006/0171603 A1 | 8/2006 | Jung et al. |
| 2006/0229063 A1 | 10/2006 | Koch |
| 2007/0003113 A1 | 1/2007 | Goldberg |
| 2008/0091723 A1 | 4/2008 | Zuckerberg et al. |
| 2008/0201327 A1 | 8/2008 | Seth |
| 2008/0211904 A1 | 9/2008 | Kato et al. |
| 2008/0243861 A1 | 10/2008 | Wassingbo et al. |
| 2008/0260212 A1 | 10/2008 | Moskal et al. |
| 2008/0310688 A1 | 12/2008 | Goldberg |
| 2009/0043725 A1 | 2/2009 | Gutta |
| 2009/0074258 A1 | 3/2009 | Cotgreave |
| 2009/0103887 A1 | 4/2009 | Choi et al. |
| 2009/0185723 A1 | 7/2009 | Kurtz et al. |
| 2009/0316961 A1 | 12/2009 | Gomez Suarez et al. |
| 2010/0036875 A1 | 2/2010 | Miezianko et al. |
| 2010/0060727 A1 | 3/2010 | Steinberg et al. |
| 2010/0150407 A1 | 6/2010 | Cheswick |
| 2010/0158315 A1 | 6/2010 | Martin |
| 2010/0172550 A1 | 7/2010 | Gilley et al. |
| 2010/0207721 A1 | 8/2010 | Nakajima et al. |
| 2010/0216441 A1 | 8/2010 | Larsson et al. |
| 2010/0241658 A1 | 9/2010 | Rathurs et al. |
| 2011/0013810 A1 | 1/2011 | Engstrom et al. |
| 2011/0022529 A1 | 1/2011 | Barsoba et al. |
| 2011/0064281 A1 | 3/2011 | Chan |
| 2011/0066743 A1 | 3/2011 | Hurley et al. |
| 2011/0142016 A1 | 6/2011 | Chatterjee |
| 2011/0182482 A1 | 7/2011 | Winters et al. |
| 2011/0182485 A1 | 7/2011 | Shochat et al. |
| 2011/0188713 A1 | 8/2011 | Chin et al. |
| 2011/0211736 A1 | 9/2011 | Krupka et al. |
| 2011/0211737 A1 | 9/2011 | Krupka et al. |
| 2011/0238755 A1 | 9/2011 | Khan et al. |
| 2011/0282860 A1 | 11/2011 | Baarman et al. |
| 2011/0307399 A1 | 12/2011 | Russell et al. |
| 2012/0008837 A1 | 1/2012 | Goldberg et al. |
| 2012/0027256 A1 | 2/2012 | Kiyohara et al. |
| 2012/0056722 A1 | 3/2012 | Kawaguchi |
| 2012/0250950 A1 | 10/2012 | Papakipos et al. |
| 2012/0278395 A1 | 11/2012 | Garcia |
| 2013/0040660 A1 | 2/2013 | Fisher et al. |
| 2013/0089243 A1 | 4/2013 | Sauve et al. |
| 2013/0117365 A1 | 5/2013 | Padmanabhan et al. |
| 2013/0136316 A1 | 5/2013 | Grassel et al. |
| 2013/0188844 A1 | 7/2013 | Goldberg |
| 2013/0194438 A1 | 8/2013 | Sweet, III et al. |
| 2013/0265448 A1 | 10/2013 | Li |
| 2013/0265450 A1 | 10/2013 | Barnes, Jr. |
| 2013/0269013 A1 | 10/2013 | Parry et al. |
| 2013/0286223 A1 | 10/2013 | Latta et al. |
| 2014/0028201 A1 | 1/2014 | Chang |
| 2014/0064576 A1 | 3/2014 | Gong et al. |
| 2014/0250126 A1 | 9/2014 | Baldwin et al. |
| 2014/0267618 A1 | 9/2014 | Esteban et al. |
| 2014/0289534 A1 | 9/2014 | Parry et al. |
| 2014/0342330 A1 | 11/2014 | Freeman et al. |
| 2014/0350840 A1 | 11/2014 | D'Argenio et al. |
| 2014/0361974 A1 | 12/2014 | Li et al. |
| 2015/0057995 A1 | 2/2015 | Neumann et al. |
| 2015/0062334 A1 | 3/2015 | Dickinson et al. |
| 2015/0066920 A1 | 3/2015 | Barta |

(56) References Cited

U.S. PATENT DOCUMENTS

| | | | |
|---|---|---|---|
| 2015/0081785 | A1 | 3/2015 | Angelsmark et al. |
| 2015/0081791 | A1 | 3/2015 | Jacobs |
| 2015/0124107 | A1 | 5/2015 | Muriello et al. |
| 2015/0169946 | A1 | 6/2015 | Needleman |
| 2015/0172787 | A1 | 6/2015 | Geramifard |
| 2015/0172853 | A1 | 6/2015 | Liu et al. |
| 2015/0181379 | A1 | 6/2015 | Pai et al. |
| 2015/0227609 | A1 | 8/2015 | Shoemaker et al. |
| 2015/0227780 | A1 | 8/2015 | Tussy |
| 2015/0227782 | A1 | 8/2015 | Salvador et al. |
| 2015/0286856 | A1 | 10/2015 | Garcia et al. |
| 2015/0304368 | A1 | 10/2015 | Vaccari et al. |
| 2015/0347827 | A1 | 12/2015 | Dickinson et al. |
| 2016/0026853 | A1 | 1/2016 | Wexler et al. |
| 2016/0071101 | A1 | 3/2016 | Winarski |
| 2016/0073010 | A1 | 3/2016 | Cronin et al. |
| 2016/0105772 | A1 | 4/2016 | Cohen |
| 2016/0150124 | A1 | 5/2016 | Panda et al. |
| 2016/0182816 | A1 | 6/2016 | Luk et al. |
| 2016/0191434 | A1 | 6/2016 | Rice |
| 2016/0205358 | A1 | 7/2016 | Dickinson |
| 2017/0116466 | A1 | 4/2017 | Resnick et al. |
| 2017/0192401 | A1 | 7/2017 | Wexler et al. |
| 2018/0025220 | A1 | 1/2018 | Dickinson et al. |
| 2018/0189571 | A1 | 7/2018 | Seo et al. |
| 2018/0234709 | A1 | 8/2018 | Melanson |
| 2018/0300554 | A1 | 10/2018 | Kansara |
| 2018/0341835 | A1 | 11/2018 | Siminoff |
| 2019/0034710 | A1 | 1/2019 | Dickinson et al. |
| 2019/0043351 | A1 | 2/2019 | Yang et al. |
| 2019/0045207 | A1 | 2/2019 | Chen et al. |
| 2019/0087646 | A1 | 3/2019 | Goulden et al. |
| 2019/0137261 | A1 | 5/2019 | Sabitov et al. |
| 2019/0179960 | A1 | 6/2019 | Im et al. |
| 2020/0074151 | A1 | 3/2020 | Resnick et al. |
| 2020/0217645 | A1 | 7/2020 | Sabitov et al. |

FOREIGN PATENT DOCUMENTS

| | | |
|---|---|---|
| JP | 2012-507761 | 3/2012 |
| WO | WO 2009/123711 | 10/2009 |
| WO | WO 2011/017653 | 2/2011 |
| WO | WO 2011/097041 | 8/2011 |
| WO | WO 2012/112992 | 8/2012 |
| WO | WO 2012/134756 | 10/2012 |
| WO | WO 2012/142054 | 10/2012 |
| WO | WO 2012/149397 | 11/2012 |
| WO | WO 2014/043738 | 3/2014 |
| WO | WO 2014/100519 | 6/2014 |
| WO | WO 2015/030911 | 3/2015 |
| WO | WO 2015/031863 | 3/2015 |
| WO | WO 2015/085246 | 6/2015 |

OTHER PUBLICATIONS

Office Action issued by the Brazilian Patent Office for Application No. BR112018007979-0, dated Jul. 14, 2020, 5 pages including informal English translation.
Office Action for U.S. App. No. 15/211,261, dated Nov. 30, 2017, 15 pages.
Office Action for U.S. Appl. No. 15/299,934, dated May 24, 2018, 15 pages.
Final Office Action for U.S. Appl. No. 15/299,934, dated Dec. 6, 2018, 19 pages.
Office Action for U.S. Appl. No. 15/299,934, dated Jul. 26, 2019, 17 pages.
International Search Report and Written Opinion for International Application No. PCT/US2016/042489, dated Oct. 21, 2016, 7 pages.
International Search Report and Written Opinion for International Application No. PCT/US2016/058189, dated Jan. 13, 2017, 8 pages.
International Search Report and Written Opinion for International Application No. PCT/US2019/048555, dated Nov. 29, 2019, 13 pages.
Extended Search Report for European Application No. 16825245.0, dated Mar. 20, 2019, 8 pages.
Extended European Search Report for European Application No. 16794804.1, dated Jul. 31, 2019, 14 pages.
Supplementary European Search Report for European Application No. 16794804.1, dated Apr. 30, 2019, 17 pages.
Office Action issued by the Japanese Patent Office for Application No. 2018-521489, dated Dec. 9, 2019, 11 pages including English translation.
Amy Held, Google App Goes Viral Making an Art out of Matching Faces to Paintings, Jan. 15, 2018, NPR.org, Retrieved from the Internet: https://www.npr.org/sections/thetwo-way/2018/01/15/578151195/google-app-goes-viral-making-an-art-out-of-matching-faces-to-paintings, 8 pages.
Ashley Gurbal Kritzer, Tampa Bay Business Journal, Vinik—backed Seattle startup brings new tech to Amalie Arena for Lightning games, Feb. 5, 2016. Retrieved from the Internet: http://www.bizjournals.com/tampabay/blog/morning-edition/2016/02/vinik-backed-seattle-startup-brings-new-tech-to.html,A171, 4 pages.
Barr et al., "Face Recognition From Video: A Review", Draft 17 International Journal of Pattern Recognition and Artificial Intelligence, 2012, 56 pages, Retrieved from the Internet Nov. 19, 2013: URL:http//www.3.nd.edu/-kwb/BarrEtAlIJPRAI 2012.pdf.
Ben Coxworth, "Software could determine where a video was shot, based on scenery and ambient sound," Feb. 19, 2015, Gizmag.com, retrieved from the internet at http://www.gizmag.com/video-geolocation- IQorithms/36172 on Oct. 6, 2015, 3 pages.
Chris Welch, How to Stop Facebook from Looking for You With Face Recognition, Mar. 27, 2018. Retrieved from the Internet: https://www.theverge.com/2018/3/27/17165150/facebook-face-recognition-how-to-turn-off-disable, 6 pages.
Co tree, Selfies—Automatic selfie by multiple faces detection, Released Mar. 26, 2015, Retrieved from the Internet: https://itunes.apple.com/us/app/selfies-automatic-selfie-by/id976846726?mt=8, 2 pages.
Colin Morris, HomeAdvisor co-founders launch photo marketplace powered by facial recognition, Built in Austin, Jan. 22, 2016. Retrieved from the Internet: http://www.builtinaustin.com/2016/01/22/waldo-photos-5-million-seed-round, 3 pages.
Collen Kriel, Alibaba shows off facial recognition to secure mobile payments, Mar. 16, 2015. Retrieved from the Internet: http://siliconangle.com/blog/2015/03/16/alibaba-shows-off-facial-recognition-to-secure-mobile-payments/, 5 pages.
ComputerWorld, Face Recognition app FindFace may make you want to take down all your online photos, May 18, 2016, 3 pages.
Dave Brooks, Nathan Hubbard's Plan to 'Rival' Ticketmaster Makes Big Claims, But Offers Few Details, May 4, 2018, Retrieved from the Internet: https://www.billboard.com/articles/business/8454599/nathan-hubbard-ticketmaster-rival, 3 pages.
Dave Gershgorn, A New App Automatically Sends That Group Photo to Your Friends, Popular Science, Mar. 7, 2016. Retrieved from the Internet: http://www.popsci.com/new-app-automatically-sends-that-group-photo-to-your-friends, 2 pages.
Doug Bolton, FindFace app which uses facial recognition to identify strangers on social media takes Russia by storm, May 18, 2016. http://www.independent.co.uk/life-style/gadgets-and-tech/news/findface-vk-app-social-media-facial-recognition-android-ios-a7035556.html, 2 pages.
Edgar Cervantes, Facebook will recognize you in photos where your face is not showing, Android Authority, Jun. 23, 2015. Retrieved from the Internet: http://www.androidauthority.com/facebook-recognize-photos-without-face-618957/, 5 pages.
Fanpics, Tell Your Story. Retrieved Nov. 30, 2016 from the Internet: https://www.fanpics.com/about, 3 pages.
FotoTiger Facial Recognition Webpage, dated Nov. 18, 2018, retrieved online on Mar. 25, 2020, at https://thenextweb.com/apps/2014/11/18/fototiger-facial-recognition-app-android-puts-photos/, 4 pages.
Ironic Sans, Idea: Fun with facial recognition, Jan. 11, 2007. Retrieved from the Internet: http://www.ironicsans.com/2007/01/idea_fun_with_facial_recogniti.html, 5 pages.

(56) References Cited

OTHER PUBLICATIONS

Jack Alexander, Next Generation of iPhones to 'Revolutionize' Photography, May Include Sony's 3D Technology and Advanced Facial Recognition, Dec. 29, 2018. Retrieved from the Internet: https://fstoppers.com/news/next-generation-iPhones-revolutionize-photography-may-include-sonys-3D-322630, 2 pages.
James Vincent, "Facial Recognition Smart Glasses Could Make Public Surveillance Discreet and Ubiquitous," Updated Jun. 12, 2019. Retrieved from the Internet: URL: https://www.theverge.com/2019/6/10/18659660/facial-recognition-smart-glasses-sunglasses-surveillance-vuzix-nntc-uae, 4 pages.
Julian Mitchell, STAPLES Center, AEG and Fanpics Partner to Put Fans at the Center of Major Sports Moments, May 27, 2015. Retrieved from the Internet: http://www.forbes.com/sites/julianmitchell/2015/05/27/staples-center-and-fanpics-team-up-putting-fans-at-the-center-of-major-sports-moments/2/#60ccf4ceba08, 5 pages.
Justin Lee, Securus patents facial recognition system for video visitation sessions, Biometric Update.com. Jun. 16, 2015. Retrieved from the Internet: http://www.biometricupdate.com/201506/securus-patents-facial-recognition-system-for-video-visitation-sessions, 3 pages.
Katy Daniells, FaceLook: Coca-Cola's Facial Recognition App, Aug. 2, 2011. Retrieved from the Internet: http://www.digitalbuzzblog.com/facelook-coca-colas-facial-recognition-app/, 12 pages.
Kim Brunhuber, Facial recognition tech is allowing stores to reward customers, CBC News, May 2, 2016, 5 pages.
Knoto, published 2016, Retrieved Dec. 12, 2016 from the Internet: http://knoto.com/, 5 pages.
Lamdba Labs, API Documentation. Retrieved from the Internet on Jan. 17, 2019 at https://lambdal.com/api-documentation, 2 pages.
Magtoapp, Inc., iTunes Preview, Celebtwin: Celebrity Look Alike Lite. Updated Jul. 5, 2016, Retrieved Dec. 2, 2016 from the Internet: https://itunes.apple.com/us/app/celebtwin-celebrity-look-alike/id381722077?mt=8, 2 pages.
Michelle Ma, Moving cameras talk to each other to identify, track pedestrians, Nov. 12, 2014. Retrieved from the Internet: http://www.washington.edu/news/2014/11/12/moving-cameras-talk-to-each-other-to-identify-track-pedestrians/, 6 pages.
Mori Rothman, Bringing facial recognition technology to the 'kiss cam' at sporting events, PBS Newshour, Sep. 24, 2013, Retrieved from the Internet: http://www.pbs.org/newshour/rundown/dhs-taps-into-crowd-cam-for-facial-recognition-research/, 2 pages.
Naaman, et al. Stanford University, "Leveraging Context to Resolve Identity in Photo Albums", 2005, 10 pages.
OSnap, Tutorial 2: Time-Lapse—Daily Self Portrait, Retrieved Nov. 30, 2016 from the Internet: http://www.osnapphotoapp.com/tutorial2.php, 6 pages.
Penny Crosman, Biometric Tipping Point: USAA Deploys Face, Voice Recognition, Feb. 3, 2015. Retrieved from the Internet: http://www.americanbanker.com/news/bank-technology/biometric-tipping-point-usaa-deploys-face-voice-recognition-1072509-1.html?zkPrintable=1&nopagination=1, 7 pages.
Peter Holley, This Patent Shows Amazon May Seek to Create a 'Database of Suspicious Persons' Using Facial-Recognition Technology, Dec. 18, 2018, Washingtonpost.com, Retrieved from the Internet: https://www.washingtonpost.com/technology/2018/12/13/this-patent-shows-amazon-may-seek-create-database-suspicious-persons-using-facial-recognition-technology/?utm_term=.476ede26a7f8, 3 pages.
Planet biometrics, Facial recognition startup will scour web for user images, Feb. 3, 2016. Retrieved from the Internet: http://www.planetbiometrics.com/article-details/i/4100/desc/facial-recognition-startup-will-scour-web-for-user-images/, 2 pages.
PR Newswire, Facial Network Releases New Demo of Facial Recognition App NameTag on Google Glass, Receives Cease and Desist from Facebook, Sep. 10, 2014, Retrieved from Internet: http://www.prnewswire.com/news-releases/facialnetwork-releases-new-demo-of-facial-recognition-app-nametag-on-google-glass-receives-cease-and-desist-from-facebook-274649581.html, 4 pages.
PR Newswire, Waldo Photos Closes $5 Million Seed Funding Round Led by Upfront Ventures, Jan. 21, 2016. Retrieved from the Internet: https://www.prnewswire.com/news-releases/waldo-photos-closes-5-million-seed-funding-round-led-by-upfront-ventures-300206555.html, 2 pages.
PR Rocket, Photo-Sharing Image Recognition Tools Advocacy Campaign Launched by ScanMyPhotos.com, Mar. 8, 2016. Retrieved from the Internet: http://www.pressreleaserocket.net/photo-sharing-image-recognition-tools-advocacy-campaign-launched-by-scanmyphotos-com/419781/, 3 pages.
Rachel Metz, A New Way to Use Facial Recognition to Find Photos of You, Feb. 2, 2016, MIT Technology Review. Retrieved from the Internet: https://www.technologyreview.com/s/600690/a-new-way-to-use-facial-recognition-to-find-photos-of-you/, 3 pages.
Rob Price, Snapchat has figured out a way to use facial recognition tech to protect people's privacy, Business Insider, Jul. 19, 2016. Retrieved from the Internet: http://www.businessinsider.com/new-snapchat-patent-uses-facial-recognition-tech-protect-privacy-photos-blurring-emojis-2016-7, 6 pages.
Ryan Whitwam, Facebook developing way to fingerprint the camera you used to take a photo, Sep. 20, 2015. Retrieved from the Internet: http://www.geek.com/news/facebook-developing-way-to-fingerprint-the-camera-you-used-to-take-a-photo-1634542/, 3 pages.
Sarah Perez, Lambda Labs Is Launching a Facial Recognition API for Google Glass, May 23, 2013. Retrieved from the Internet: http://techcrunch.com/2013/05/23/lambda-labs-is-launching-a-facial-recognition-api-for-google-glass/, 15 pages.
Sarah Perez, Waldo Raises $5 Million for a Photo-Finding Platform Targeting Professional Photographers & Events, TechCrunch, Jan. 21, 2016. Retrieved from the Internet: Dec. 2, 2016 at https://techcrunch.com/2016/01/21/waldo-raises-5-million-for-a-photo-finding-platform-targeting-professional-photographers-events/, 9 pages.
Seatrade Cruise News, The Image Group provides photo buyers mobile-friendly instant gratification, Nov. 8, 2015. Retrieved from the Internet: http://www.seatrade-cruise.com/news/news-headlines/image-provides-photo-buyers-mobile-friendly-instant-gratification.html, 2 pages.
Taylor Soper, Ex-Microsoft manager raises cash from sports team owners to enhance the fan experience at live games, GeekWire, Feb. 4, 2016. Retrieved from the Internet: http://www.geekwire.com/2016/ex-microsoft-manager-raises-cash-sports-team-owners-enhance-fan-experience-live-games/, 16 pages.
Texas TechPulse, Waldo Photos: Finding Your Photos in the Proverbial Haystack, Feb. 3, 2016. Retrieved from the Internet: http://www.texastechpulse.com/waldo_photos_finding_your_photos_in_the_proverbial_haystack/s-0063812.html, 3 pages.
The Ghost in the Camera, How facial recognition technology mines your face for information, Feb. 2016, 1 page.
Vlad Savov, Sony Promises Better Face Identification Through Depth-Sensing Lasers, Jan. 2, 2019. Retrieved from the Internet: https://www.theverge.com/2019/1/2/18164881/sony-tof-laser-depthsensing-3d-camera-report, 3 pages.
Waldo Photos, Retrieved from the Internet: https://waldo.photos/, published Oct. 9, 2016, Retrieved Nov. 30, 2016, 3 pages.
Zhang et al., "Image Based Localization in Urban Environments", 3D Data Processing, Visualization, and Transmission, Third International Symposium on, IEEE, PI, pp. 33-40 (2006).
ZoOmTM, The World's First Secure Selfie 3D Authentication App, Announced by FacialNetwork, Jul. 8, 2015. Retrieved from the Internet: http://www.marketwatch.com/story/zoomtm-the-worlds-first-secure-selfie-3d-authentication-app-announced-by-facialnetwork-2015-07-08, 9 pages.

* cited by examiner

APPARATUS AND METHODS FOR FACIAL RECOGNITION SYSTEMS TO IDENTIFY PROXIMITY-BASED CONNECTIONS

BACKGROUND

The embodiments described herein relate generally to facial recognition and/or video analytics, and more particularly, to apparatus and methods for performing facial recognition analysis to identify proximity-based user connections.

Increases in the availability and capability of electronic devices such as cameras, tablets, smartphones, etc. have allowed some people to take pictures and/or capture video of their experiences. For example, the inclusion and improvement of cameras in smartphones, tablets, and/or other similar devices have led to increases in those devices being used to take pictures (e.g., photographic data, image data, etc.) and videos (e.g., video stream data). While, it has become easier for some people to take pictures and/or videos of their experiences, in some instances, there can still be challenges in including the desired parties (including the person who would otherwise be taking the picture or video). Moreover, a person generally has to remember and/or have the chance to take the picture and/or video, and failing to do can result in a lost opportunity.

In some instances, venues and/or events such as sporting events, concerts, rallies, graduations, and/or the like have cameras that can take pictures and/or video of those in attendance. In some instances, however, analyzing, parsing, and/or otherwise making the pictures and/or video stream available can use a relatively large amount of resources, can be inaccurate, and/or can fail to provide associated contextual data or the like. In some known systems, facial recognition technology can be used to facilitate the process of identifying people in the pictures and/or video stream captured at these venues and/or events and some such systems can be configured to distribute and/or otherwise make available the pictures and/or video stream to the people identified therein. While such systems may aid a person (e.g., a user) in memorializing events and/or the like by capturing them in pictures and/or video, in some instances, it may be desirable to receive information and/or notification when one or more people who have a connection with the person are also present at the venue and/or event to allow for shared experiences and/or the like.

Thus, a need exists for improved apparatus and methods for performing facial recognition analysis on one or more images and providing a user with one or more notifications when a result of the facial recognition analysis indicates that a person sharing a connection with the user is identified in the analyzed one or more images.

SUMMARY

In some embodiments, an apparatus includes a memory, a communication interface in communication with the memory and configured to communicate via a network, and a processor in communication with the memory and the communication interface. The processor is configured to receive, via the network and the communication interface, at least one image from an image capture device and to analyze the at least one image via facial recognition to define an analyzed data set associated with the at least one image. The processor is configured to (1) identify a user based on data included in an associated user profile data structure from a number of user profile data structures stored in the memory, (2) identify a set of people connected to the user based on user connection data associated with the user from at least one connection database, (3) compare the analyzed data set to facial image data—accessible via the at least one connection database—of a person from the set of people connected to the user, and (4) define a confidence level based on comparing the analyzed data set to the facial image data of the person from the set of people connected to the user. When the confidence level satisfies a criterion, the processor is configured to send to a client device associated with the user a signal indicative of a notification that the person from the set of people connected to the user is within a predetermined proximity of the user.

DETAILED DESCRIPTION

Figure 1:
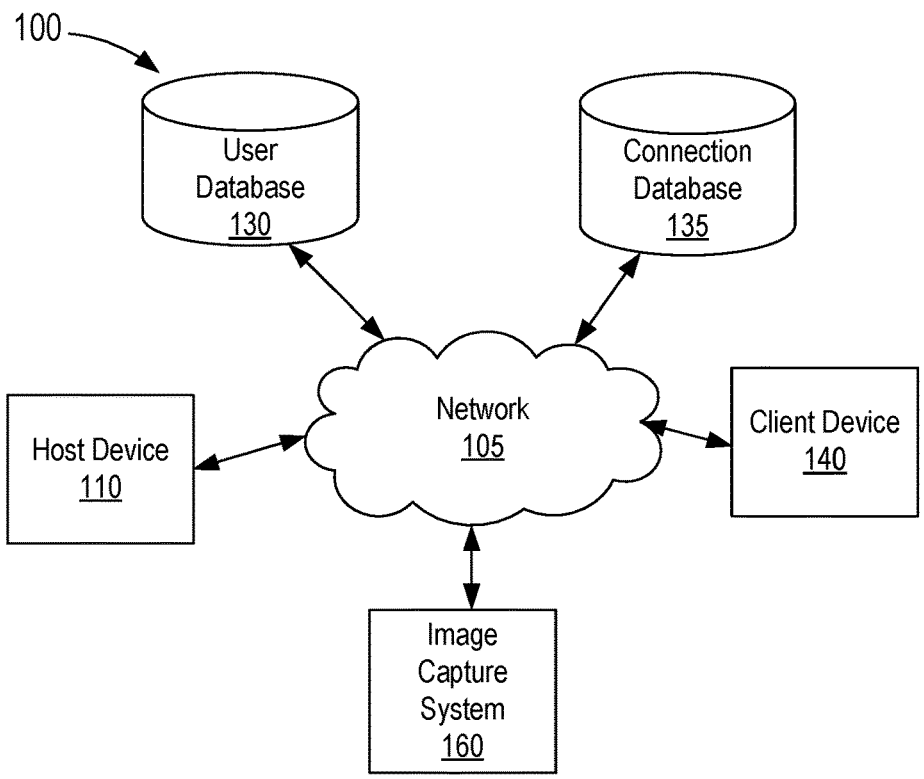
FIG. 1 is a schematic illustration of a recognition and notification system according to an embodiment.

In some embodiments, an apparatus includes a memory, a communication interface in communication with the memory and configured to communicate via a network, and a processor in communication with the memory and the communication interface. The processor is configured to receive, via the network and the communication interface, at least one image from an image capture device and to analyze the at least one image via facial recognition to define an analyzed data set associated with the at least one image. The processor is configured to (1) identify a user based on data included in an associated user profile data structure from a number of user profile data structures stored in the memory, (2) identify a set of people connected to the user based on user connection data associated with the user from at least one connection database, (3) compare the analyzed data set to facial image data—accessible via the at least one connection database—of a person from the set of people connected to the user, and (4) define a confidence level based on comparing the analyzed data set to the facial image data of the person from the set of people connected to the user. When the confidence level satisfies a criterion, the processor is configured to send to a client device associated with the user a signal indicative of a notification that the person from the set of people connected to the user is within a predetermined proximity of the user.

In some embodiments, an apparatus includes a memory, a communication interface in communication with the memory and configured to communicate via a network, and a processor in communication with the memory and the communication interface. The processor is configured to receive, via the network and the communication interface, at least one image from an image capture device associated with a venue. The processor is configured to identify a user present at the venue based on data included in an associated user profile data structure from a number of user profile data structures stored in the memory. The processor is further configured to (1) identify a set of people connected to the user based on user connection data associated with the user from at least one connection database, (2) analyze the at least one image via facial recognition with respect to facial image data—accessible via the at least one connection database—of a person from the set of people connected to the user, and (3) define a confidence level associated with identifying the person from the set of people connected to the user in the at least one image. When the confidence level satisfies a criterion, the processor is configured to send to a client device associated with the user a signal indicative of a notification that the person from the set of people connected to the user is present at the venue.

In some implementations, a method includes receiving, at a host device and via a network, at least one image from an image capture device associated with a venue. A user is identified based on data included in an associated user profile data structure from a number of user profile data structures. A set of people connected to the user are identified based on user connection data associated with the user from at least one connection database. Facial recognition analysis is performed on the at least one image with respect to facial image data—accessible via the at least one connection database—of a person from the set of people connected to the user. A confidence level is defined based on a result of the facial recognition analysis with respect to the facial image data of the person from the set of people connected to the user. In response to the confidence level satisfying a criterion, a signal is sent via the network to a client device associated with the user. The signal is indicative of a notification that the person from the set of people connected to the user is within a predetermined proximity of the user.

As used in this specification, the singular forms "a," "an" and "the" include plural referents unless the context clearly dictates otherwise. Thus, for example, the term "a device" is intended to mean a single device or a combination of devices, "a network" is intended to mean one or more networks, or a combination thereof.

Electronic devices are described herein that can include any suitable combination of components configured to perform any number of tasks. Components, modules, elements, etc. of the electronic devices can refer to any assembly, subassembly, and/or set of operatively-coupled electrical components that can include, for example, a memory, a processor, electrical traces, optical connectors, software (executing in hardware), and/or the like. For example, an electronic device and/or a component of the electronic device can be any combination of hardware-based components and/or modules (e.g., a field-programmable gate array (FPGA), an application specific integrated circuit (ASIC), a digital signal processor (DSP)), and/or software-based components and/or modules (e.g., a module of computer code stored in memory and/or executed at the processor) capable of performing one or more specific functions associated with that component and/or otherwise tasked to that electronic device.

The embodiments described herein relate generally to image analysis, which can include analysis of a single and/or still image (e.g., a picture) or multiple images or frames that collectively form a "video stream." A "video stream" can be sent, received, and/or analyzed as a continuous video recording or can be sent, received, and/or analyzed as any number of individual frames or still images, which collectively form the "video stream." While references may be made herein to either an "image" or a "video," it should be understood that such a reference is not to the exclusion of either a "video" or an "image," respectively, unless the context clearly states otherwise. In other words, any of the apparatus, systems, and/or methods described herein can be used in or for image analysis and video analysis and reference to a specific type of analysis is not intended to be exclusive unless expressly provided.

The embodiments and methods described herein can use facial recognition analysis to identify one or more people in one or more images and/or video streams. As used herein, "facial recognition analysis"—or simply, "facial recognition"—generally involves analyzing one or more images of a person's face to determine, for example, salient features of his or her facial structure (e.g., cheekbones, chin, ears, eyes, jaw, nose, hairline, etc.) and then defining a qualitative and/or quantitative data set associated with and/or otherwise representing the salient features. One approach, for example, includes extracting data associated with salient features of a person's face and defining a data set including geometric and/or coordinate based information (e.g., a three-dimensional (3-D) analysis of facial recognition and/or facial image data). Another approach, for example, includes distilling image data into qualitative values and comparing those values to templates or the like (e.g., a two-dimensional (2-D) analysis of facial recognition and/or facial image data). In some instances, another approach can include any suitable combination of 3-D analytics and 2-D analytics.

Any of the embodiments and/or methods described herein can use and/or implement any suitable facial recognition method and/or algorithm or combination thereof. Examples of facial recognition methods and/or algorithms can include but are not limited to Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural networks (CNN), and/or the like or combination thereof.

In some instances, facial recognition analysis can result in a positive identification of facial image data in one or more images and/or video streams when the result of the analysis satisfies a criteria(ion). In some instances, the criteria(ion) can be associated with a minimum confidence score or level and/or matching threshold, represented in any suitable manner (e.g., a value such as a decimal, a percentage, and/or the like). For example, in some instances, the criteria(ion) can be a threshold value or the like such as a 70% match of the image data to the facial image data (e.g., stored in a database), a 75% match of the image data to the facial image data, a 80% match of the image data to the facial image data, a 85% match of the image data to the facial image data, a 90% match of the image data to the facial image data, a 95% match of the image data to the facial image data, a 97.5% match of the image data to the facial image data, a 99% match of the image data to the facial image data, or any percentage therebetween.

In some implementations, the embodiments and/or methods described herein can analyze any suitable data (e.g., contextual data) in addition to the facial image data, for example, to enhance an accuracy of the confidence level and/or level of matching resulting from the facial recognition analysis. For example, in some instances, a confidence level and/or a level of matching can be adjusted based on analyzing contextual data associated with any suitable source, activity, location, pattern, purchase, ticket sale, social media post, social media comments, social media likes, web browsing data, preference data, and/or any other suitable data. In some instances, a confidence level can be increased when the contextual data supports the result of the facial recognition analysis and can be decreased when the contextual data does not support and/or contradicts the result of the facial recognition analysis. Accordingly, non-facial recognition data can be used to corroborate the facial recognition data and/or increase/decrease a confidence score and/or level.

The embodiments and methods described herein can be implemented to identify one or more people who share a "social connection" or "professional connection" with a user. As used herein, the terms "social connection" and/or "professional connection"—or simply, "connection(s)"—can, for example, refer to an association and/or relationship between two user accounts (and thus, the people represented by those user accounts) on one or more connection databases, social networking services, professional networking services, and/or the like. For example, in some instances, two people can be "connected" when their user accounts on one or more social or professional networking services are "friends," "buddies," and/or otherwise have a "connection." In other instances, a person can be "connected" when his or her user account "follows" another's user account on one or more social or professional networking services. In this context, a "social networking service" (also known as "social media") is intended to refer generally to any suitable electronic network platform that provides a user with a way to "connect" and/or "associate" with another user. Moreover, a "professional networking service" may refer to a specific social media platform intended to be used to facilitate relationships, for example, in a professional context. It should be understood that the embodiments and/or methods described herein are not intended to be limited in any way to a specific social networking service, a specific professional networking service, or to "social media" in general, to identify and/or define a "connection" between people (or the user accounts representing those people). As such, a "connection" can be identified and/or defined based on data stored in any suitable connection and/or relational database. Furthermore, the term "connection" may refer to a "social connection", a "professional connection", and/or any other association between two or more user accounts and/or the two or more people represented by those user accounts.

In some instances, a connection between people (or the user accounts representing those people) can be characterized in terms of "degree." As used herein, the term "degree" refers to how direct a connection between two or more people is. For example, a connection between a first person and a second person can be referred to as a "first degree connection" when the first person and the second person share a direct connection (e.g., when the first person and the second person are "friends" and/or "follow" each other on one or more social networking services). A connection between the first person and the second person can be referred to as a "second degree" connection when the first person and the second person share an indirect connection. For example, a "second-degree connection" can be when each of the first person and the second person shares a first-degree connection with a third person but the first and second person do not share a first-degree connection with each other. In other words, the second person is a "friend of a friend" to the first person. A degree of connection can continue to increase as a connection between two people becomes more indirect.

FIG. 1 is a schematic illustration of a recognition and notification system 100 (also referred to herein as "system") according to an embodiment. At least a portion of the system 100 can be, for example, represented and/or described by a set of instructions or code stored in a memory and executed in a processor of one or more electronic devices (e.g., a host device, a server or group of servers, a personal computer (PC), a network device, a client device, and/or the like). In some implementations, the system 100 can be used to notify a user (e.g., a user registered and/or associated with the system 100) that one or more people sharing a social connection or a professional connection with the user (e.g., a "friend" or connection on a social or professional networking service) are within a predetermined proximity of the user and/or are otherwise at the same venue, event, and/or substantially the same location.

As a general example, a host device can receive a signal associated with a request to register and/or associate a user. To register and/or associate the user, the host device can request or receive data associated with the user and/or one or more electronic devices associated with and/or controlled by the user. As such, registering and/or associating a user with the system 100 can refer broadly to a process of defining a mode of identifying a specific user. In some instances, a user can "sign up" or "register" with the system 100. In other instances, the system 100 and/or a host device of the system can receive any suitable identifying data from the user or an electronic device associated with the user. Such data may include, for example, location data, check-in data, authentication or authorization data, image or video data, audio data, and/or any other suitable data that can be used to generate an way to identify a user (e.g., identifying data) and/or any suitable association between the user and the system 100.

In some implementations, the host device can store the data received from the user and/or the electronic device associated with the user in memory and/or in a database (e.g., included in the memory or independent of the memory). In some instances, the host device can receive one or more images and/or image data from an image capture device (e.g., a camera and/or video recorder) associated with and/or otherwise at a venue, event, and/or location, and based on data associated with the user or the user's electronic device, can determine that the user is present at the venue, event, and/or location. In some instances, the host device can define a set of people, each of whom share a connection with the user on at least one connection database, social networking service, professional networking surface, and/or the like. After defining the set of people connected to the user (also referred herein as "connection(s)"), the host device can analyze the one or more images and/or image data via facial recognition with respect to facial image data associated with each connection. If the host device identifies a connection in the one or more images and/or image data with a sufficient degree of confidence, the host device can send to an electronic device associated with the user a signal that includes instructions to provide the user with a notification that the connection (e.g., a social media "friend") is at the venue, event, and/or location, and/or is otherwise within a predetermined proximity of the user.

The system 100 includes a host device 110 that is in communication with a user database 130, a connection database 135, one or more client devices (shown in FIG. 1 as client device 140), and an image capture system 160 via a network 105. In some implementations, the system 100 is configured to provide and/or perform, in substantially real-time, facial recognition analysis on one or more images. In addition, the system 100 is configured provide to a user, in substantially real-time, one or more notifications when a result of the facial recognition analysis satisfies one or more criterion. More particularly, the system 100 can be configured to provide a user with one or more notifications when a result of facial recognition analysis indicates that a person sharing a connection with the user is identified in the analyzed image with a desired level of confidence, as described in further detail herein.

The network 105 can be any type of network or combination of networks such as, for example, a local area network (LAN), a wireless local area network (WLAN), a virtual network (e.g., a virtual local area network (VLAN)), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, and/or any other suitable network. The network 105 can be implemented as a wired and/or wireless network. By way of example, the network 105 can be implemented as a wireless local area network (WLAN) based on the Institute of Electrical and Electronics Engineers (IEEE) 802.11 standards (also known as "WiFi®"). Moreover, the network 105 can include a combination of networks of any type such as, for example, a LAN or WLAN and the Internet. In some embodiments, communication (e.g., between the host device 110 and the client device 140) can be established via the network 105 and any number of intermediate networks and/or alternate networks (not shown), which can be similar to or different from the network 105. As such, data can be sent to and/or received by devices, databases, systems, etc. using multiple communication modes (e.g., associated with any suitable network(s) such as those described above) that may or may not be transmitted using a common network. For example, in some implementations, the client device 140 can be a mobile telephone (e.g., smartphone) connected to the host device 110 via a cellular network and the Internet (e.g., the network 105).

In some instances, the network can facilitate, for example, a peer networking session or the like. In such instances, the peer networking session can include, for example, client devices and/or any other suitable electronic device, each of which share a common characteristic. For example, in some instances, a peer networking session can include any suitable client device or group of client devices that is/are within a predetermined proximity of a venue, event, location, etc. (e.g., a sports event, concert, wedding, party, gathering, graduation, and/or the like). In some instances, a peer networking session can be automatically established based on data associated with the user and/or the client device. For example, such data can be associated with, indicative of, and/or otherwise represent a connection between two or more users. In other instances, a peer networking session can be automatically established based on one or more users "checking-in" and/or otherwise publicizing his or her presence at the venue or the like (e.g., "squawk" the user's presence). In some instances, a user can "check-in" at a time the user arrived at an event or the like at a time of registration, at a time of capturing an image or video stream, and/or the like. Moreover, the "check-in" can include identifying information such as, for example, geo-location data, date and time data, personal or user identification data, etc.

In other instances, a user can manually establish a peer networking session including, for example, a predetermined set or group of users. In some instances, such peer networking sessions can be one or more public networks, private networks, and/or otherwise limited access networks. In some instances, a user can establish a peer networking session in response to receiving a notification that one or more people who share a connection with the user are also at the venue or event, and/or are otherwise within a predetermined distance from the user. In some instances, a user can request to join a peer networking session and/or can receive an invitation to join a peer networking session and/or the like. In some instances, establishing a peer networking session can, for example, facilitate communication (e.g., group chat sessions or the like) and/or sharing of image and/or video data between users included in the peer networking session.

The host device 110 can be any suitable device configured to send data to and/or receive data from at least the user database 130, the connection database 135, the client device 140, and/or the image capture system 160 via the network 105. In some implementations, the host device 110 can function as, for example, a personal computer (PC), a workstation, a server device (e.g., a web server device), a network management device, an administrator device, and/or so forth. In some implementations, the host device 110 can be any number of servers, devices, and/or machines collectively configured to perform as the host device 110. For example, the host device 110 can be a group of servers housed together in or on the same blade, rack, and/or facility or distributed in or on multiple blades, racks, and/or facilities.

In some implementations, the host device 110 can be a virtual machine, virtual private server, and/or the like that is executed and/or run as an instance or guest on a physical server or group of servers. For example, the host device 110 can be an instance that is stored, run, executed, and/or otherwise deployed in a cloud-computing environment. Such a virtual machine, virtual private server, and/or cloud-based implementation can be similar in at least form and/or function to a physical machine. Thus, the host device 110 can be implemented as one or more physical machine(s) or as a virtual machine run on a physical machine. Similarly stated, the host device 110 may be configured to perform any of the processes, functions, and/or methods described herein whether implemented as a physical machine or a virtual machine.

Figure 3:
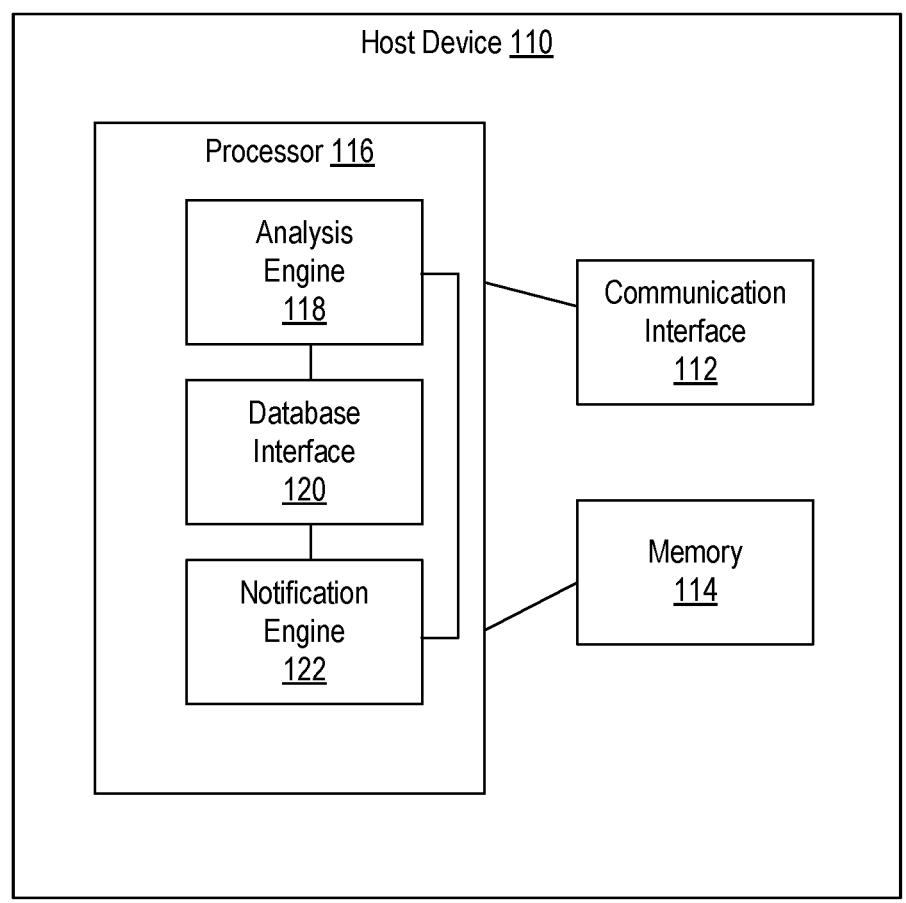
FIGS. 3 and 4 are schematic illustrations of a host device and a client device, respectively, included in the recognition and notification system of FIGS. 1 and/or 2.

The host device 110 includes at least a communication interface 112, a memory 114, and a processor 116 (see FIG. 3). The communication interface 112, the memory 114, and the processor 116 are connected and/or electrically coupled so that signals can be sent therebetween. The host device 110 can also include and/or can otherwise be operably coupled to the user database 130 configured to store user data, facial recognition data, contextual data (e.g., associated with a time, location, venue, event, etc.), video streams, and/or the like.

The communication interface 112 can be any suitable hardware-based and/or software-based device(s) (executed by a processor) that can place the host device 110 in communication with the user database 130, the client device 140, and/or the image capture device 160 via the network 105. In some implementations, the communication interface 112 can further be configured to communicate via the network 105 and/or any other network with any other suitable device and/or service configured to gather and/or at least temporarily store data such as user data, image data, video stream data, facial recognition data, notification data, and/or the like. In some implementations, the communication interface 112 can include one or more wired and/or wireless interfaces, such as, for example, network interface cards (NIC), Ethernet interfaces, optical carrier (OC) interfaces, asynchronous transfer mode (ATM) interfaces, and/or wireless interfaces (e.g., a WiFi® radio, a Bluetooth® radio, a near field communication (NFC) radio, and/or the like). As such, the communication interface 112 can be configured to send signals between the memory 114 and/or processor 116, and the network 105, as described in further detail herein.

The memory 114 of the host device 110 can be, for example, a random access memory (RAM), a memory buffer, a hard drive, a read-only memory (ROM), an erasable programmable read-only memory (EPROM), an electrically erasable programmable read-only memory (EEPROM), flash memory and/or any other suitable solid state non-volatile computer storage medium, and/or the like. In some instances, the memory 114 includes a set of instructions or code (e.g., executed by the processor 116) used to perform one or more actions associated with, among other things, communicating with the network 105 and/or one or more actions associated with receiving, analyzing, and/or presenting image data, as described in further detail herein.

The processor 116 of the host device 110 can be any suitable processor such as, for example, a general-purpose processor (GPP), a central processing unit (CPU), an accelerated processing unit (APU), a graphics processor unit (GPU), a network processor, a front end processor, a Field Programmable Gate Array (FPGA), an Application Specific Integrated Circuit (ASIC), and/or the like. The processor 116 is configured to perform and/or execute a set of instructions, modules, and/or code stored in the memory 114. For example, the processor 116 can be configured to execute a set of instructions and/or modules associated with, among other things, communicating with the network 105 and/or receiving, analyzing, registering, defining, storing, and/or sending image data, facial recognition data, and/or any other suitable data, as described in further detail herein.

In some implementations, the processor 116 of the host device 110 can include portions, modules, components, engines, interfaces, circuits, etc. configured to execute and/or perform specific and/or desired processes or tasks. The portions of the processor 116 can be, for example, hardware modules or components, software modules and/or components stored in the memory 114 and/or executed in the processor 116, or any combination thereof. For example, as shown in FIG. 3, the processor 116 includes and/or executes an analysis engine 118, a database interface 120, and a notification engine 122. The analysis engine 118, the database interface 120, and the notification engine 122 can be connected and/or electrically coupled such that signals can be sent therebetween.

The analysis engine 118 can include a set of instructions and/or can execute a set of instructions associated with receiving, collecting, aggregating, and/or analyzing image data, video data, user data, facial recognition data, and/or any other suitable data of a user and/or a video stream. For example, the analysis engine 118 can receive data from the communication interface 112, the database interface 120, the notification engine 122, and/or the like. In some instances, the data associated with a user (e.g., facial recognition information, profile information, preferences, activity logs, location information, contact information, calendar information, social media connections, social media activity information, etc.), a venue (e.g., location data, resource data, event schedule), an event, an image or video, and/or the like. In response, the analysis engine 118 can perform and/or execute any number of processes associated with analyzing the data, as described in further detail herein. Moreover, in some instances, the analysis engine 118 can be configured to send analyzed data to the communication interface 112, the database interface 120, the notification engine 122, and/or the like.

The database interface 120 can include a set of instructions and/or can execute a set of instructions associated with querying, monitoring, updating, and/or otherwise communicating with one or more databases such as, for example, the user database 130 and/or the connection database 135. For example, the database interface 120 can include instructions to cause the processor 116 to update data stored in the user database 130 with user data, image data, facial recognition data, and/or the like received from the analysis engine 118. In some implementations, the database interface 120 can be configured to define and/or update any number of user profile data structures that can be stored, for example, in the user database 130. In some implementations, the database interface 120 can be configured query and/or request data from the connection database 135. For example, in some instances, the database interface 120 can query the connection database 135 for information and/or data associated with one or more people or a user profile of one or more people sharing a connection with a user (e.g., a user associated with a user profile data structure stored in the user database), as described in further detail herein. Moreover, in some instances, the database interface 120 can be configured to send any suitable data to the analysis engine 118 for processing and/or analysis.

The notification engine 122 can include a set of instructions and/or can execute a set of instructions associated with defining one or more images, video streams, and/or notifications. For example, the notification engine 122 can define one or more notifications (or instructions operable to cause an electronic device to present one or more notifications) in response to instructions received, for example, from the analysis engine 118. More specifically, in some instances, the notification engine 122 can be configured to define a notification in response to the analysis engine 118 determining that a person sharing a connection with a user (e.g., a registered user) is within a predetermined proximity of the user (e.g., is present at the same venue or substantially the same location). After the notification is defined, the host device 110 can send to an electronic device associated with the user (e.g., the client device 130) a signal that is indicative of an instruction to cause the electronic device to present the notification and/or an instance of the notification on the electronic device, as described in further detail herein. Moreover, in some instances, the notification and/or data included in or with the notification can include one or more portions or instances of the image data depicting the person connected to the user.

Returning to FIG. 1, the user database 130 can be any suitable database such as, for example, a relational database, an object database, an object-relational database, a hierarchical database, a network database, an entity-relationship database, a structured query language (SQL) database, an extensible markup language (XML) database, a digital repository, a media library, a cloud server or storage, and/or the like. In some implementations, the user database 130 can be and/or can include a relational database, in which data can be stored, for example, in tables, matrices, vectors, etc. according to the relational model. In some implementations, the user database 130 is in communication with the host device 110 over one or more suitable networks (e.g., the network 105 via the communication interface 112 of the host device 110). In such implementations, the user database 130 can be included in or stored by a network attached storage (NAS) device that can communicate with the host device 110 over the network 105 and/or any other network(s). In other embodiments, the user database can be operably coupled to the host device 110 via a cable, a bus, a server rack, and/or the like. In still other embodiments, the user database can be stored in the memory of the host device.

The user database 130 can store and/or at least temporarily retain data associated with the system 100. For example, in some instances, the user database 130 can store data associated with and/or otherwise representing user profiles, resource lists, facial recognition data, facial recognition modes and/or methods, contextual data (e.g., data associated with a time, location, venue, event, etc.), image data, video stream data or portions thereof, and/or the like. In some implementations, the user database 130 can store data associated with users who are associated with and/or have registered with the system 100 (e.g., "registered users"). For example, data associated with users can be stored in or by the user database 130 as at least a part of a user profile data structure and/or the like. In some implementations, data included in the user profile data structure can include data associated with a set of people who share a social connection and/or professional connection with the user (e.g., a connection or relationship stored in the connection database 135, a connection or relationship on one or more social and/or professional networking services, and/or the like). In some implementations, the host device 110 can be configured to store in the user database 130 image data (and/or video stream data) received from an image or video source (e.g., the image capture system 160) and/or facial recognition data resulting from the host device 110 analyzing the image data. In some instances, the user database 130 can also store contextual data associated with the image data, one or more users, and/or any other contextual data.

The connection database 135 can be any suitable database such as, for example, a relational database, an object database, an object-relational database, a hierarchical database, a network database, an entity-relationship database, a SQL database, an XML database, digital repository, a media library, a cloud server or storage, and/or the like. In some embodiments, the connection database 135 can be and/or can include a relational database, in which data can be stored, for example, in tables, matrices, vectors, etc. according to the relational model. In some embodiments, the connection database 135 is in communication with the host device 110 over one or more suitable networks (e.g., the network 105 via the communication interface 112 of the host device 110).

The connection database 135 can store and/or at least temporarily retain data associated with any suitable connection service, social networking service, professional networking service, and/or the like. For example, in some instances, the connection database 135 can store user profile data structures associated with one or more social networking services. In other instances, the connection database 135 can store data representing a connection and/or relationship between two or more people or between a user account of two or more people in any suitable manner.

In some implementations, the connection database 135 can be a third-party database and/or storage medium that is independent of the system 100. In such implementations, the user can grant the system 100 permission to access, query, and/or otherwise use data associated with the user that is stored in the connection database 135. For example, in some implementations, the connection database 135 can be a database or other storage medium storing data associated with and/or at least partially representing a social networking service or platform. In some instances, registering with the system 100 can include granting the system 100 (e.g., the host device 110) permission to access, query, and/or otherwise use data associated with the user (also referred to as "user data") that is stored in the connection database 135. In some instances, the user can grant the system 100 (e.g., the host device 110) with permission to access, read, and/or copy user data from the connection database 135 but not permission to write, update, save, and/or otherwise modify the data stored in the connection database 135. In some instances, the permission can be granted, denied, and/or otherwise controlled via the connection service and/or social networking service associated with and/or controlling the connection database 135. As described in further detail herein, in some implementations, the system 100 (e.g., the database interface 120 of the host device 110) can be configured to query the connection database 135 to determine, identify, copy, and/or define a set of people who are connected to the user on the connection service or social networking service owning or controlling the connection database 135. Moreover, in some implementations, the database interface 120 can query and/or request facial image data associated with each connected person, which in turn, can be used in one or more facial recognition processes to determine if a particular connected person can be identified in image data received from the image capture system 160.

Figure 4:
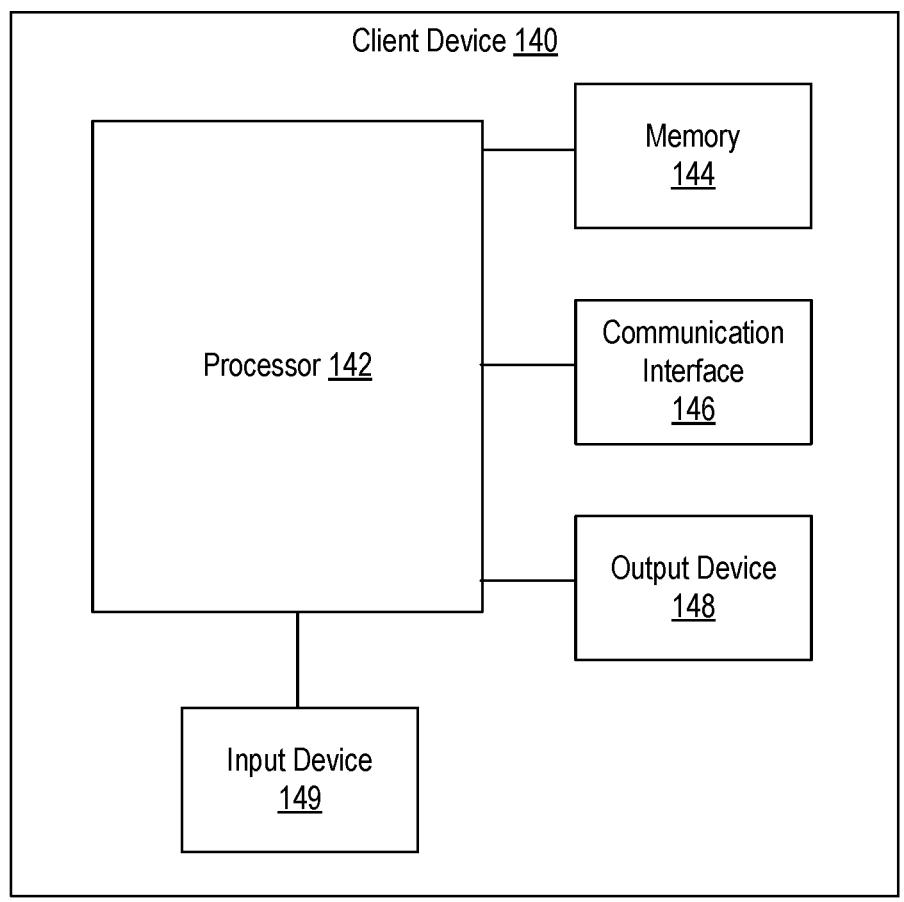

The client device 140 can be any suitable device such as a PC, a laptop, a convertible laptop, a tablet, a personal digital assistant (PDA), a smartphone, a wearable electronic device (e.g., a smart watch, etc.), and/or the like. As shown in FIG. 4, the client device 140 can include at least a memory 142, a processor 144, a communication interface 146, an output device 148, and an input device 149. The memory 142, the processor 144, the communication interface 146, the output device 148, and the input device 149 can be connected and/or electrically coupled to each other via any suitable connection, bus, interface, and/or the like such as to allow signals to be sent therebetween.

In some embodiments, the memory 142 can be a RAM, a memory buffer, a hard drive, a ROM, an EPROM, an EEPROM, a flash memory or any other suitable solid-state non-volatile computer storage medium, and/or the like. The processor 144 can be any suitable processing device configured to run or execute a set of instructions or code (e.g., stored in the memory 142) such as a GPP, a CPU, an APU, a GPU, a FPGA, an ASIC, and/or the like. Such a processor 144 can run or execute a set of instructions or code stored in the memory 142 associated with using a PC application, a mobile application, an internet web browser, a cellular and/or wireless communication (via a network), and/or the like. In some instances, the processor 144 can execute a set of instructions or code stored in the memory 142 associated with transmitting signals and/or data between the client device 140 and the host device 110 via the network 105. Moreover, in some instances, the processor 144 can execute a set of instructions received from the host device 110 associated with providing to the user of the client device 140 any suitable notification informing the user that one or more people with whom the user shares a connection is within a predetermined proximity of the user and/or is otherwise present at the same venue, event, and/or the like, as described in further detail herein. In some implementations, at least the memory 142 and the processor 144 can be included in and/or can form at least a portion of a System on Chip (SoC) integrated circuit.

The communication interface 146 of the client device 140 can be any suitable module, component, and/or device that can place the client device 140 in communication with the network 105 such as one or more network interface cards and/or the like. Such a network interface card can include, for example, an Ethernet port, a USB port, a WiFi® radio, a Bluetooth® radio, an NFC radio, a cellular radio, and/or the like. Moreover, the communication interface 146 can be electrically connected to the memory 142 and the processor 144. As such, the communication interface 146 can send signals to and/or receive signals from the processor 144 associated with electronically communicating, for example, with the host device 110 via the network 105.

The output device 148 of the client device 140 can be any suitable device configured to provide an output resulting from one or more processes being performed on or by the client device 140. For example, in some implementations, the output device 148 is a display such as, for example, a cathode ray tube (CRT) monitor, a liquid crystal display (LCD) monitor, a light emitting diode (LED) monitor, and/or the like that can graphically represent data and/or any suitable portion of the system 100 (e.g., a graphical user interface (GUI) associated with a webpage, PC application, mobile application, and/or the like). In some implementations, such a display can be and/or can include a touch screen configured to receive a tactile and/or haptic tactile user input. In some instances, such a display can be configured to graphically represent data associated with any suitable PC application, mobile application, imaging and/or recording device, and/or one or more notifications that may or may not be associated with a PC or mobile application, as described in further detail herein. In other implementations, the output device 148 can be configured to provide any suitable output such as, for example, an audio output, a tactile or haptic output, a light output, and/or any other suitable output.

The input device(s) 149 of the client device 140 can be any suitable module, component, and/or device that can receive and/or capture one or more inputs (e.g., user inputs) and that can send signals to and/or receive signals from the processor 144 associated with the one or more inputs. In some implementations, the input device(s) can be and/or can include ports, plugs, and/or other interfaces configured to be placed in electronic communication with a device. For example, such an input device 149 can be a universal serial bus (USB) port, an Institute of Electrical and Electronics Engineers (IEEE) 1394 (FireWire) port, a Thunderbolt port, a Lightning port, and/or the like. In some implementations, a touch screen or the like of a display (e.g., the output device 148) can be an input device 149 configured to receive a tactile and/or haptic user input.

In some implementations, an input device 149 can be a camera and/or other imaging device capable of capturing images and/or recording videos (referred to generally as a "camera"). For example, in some embodiments, such a camera can be integrated into the client device 140 (e.g., as in smartphones, tablets, laptops, etc.) and/or can be in communication with the client device 140 via a port or the like (e.g., such as those described above). The camera can be any suitable imaging device such as, for example, a webcam, a forward or rearward facing camera included in a smartphone or tablet, and/or any other suitable camera. In some instances, the user can manipulate the client device 140 to cause the camera to generate and/or capture image data (e.g., a picture or a video) of a field of view. Moreover, the display 148 can be configured to graphically represent the image data of the field of view captured by the camera. In some implementations, the input device 149 can be a forward facing camera of a smartphone, tablet, or wearable electronic device that can allow the user to take a picture or video of himself or herself via the camera (e.g., also known as a "selfie"). In some instances, an image of the user's face (e.g., a selfie) can be used to register facial recognition data associated with the user in or with the system 100, as described in further detail herein.

Returning to FIG. 1, the image capture system 160 can be and/or can include any suitable device or devices configured to capture image data. For example, the image capture system 160 can be and/or can include one or more cameras and/or image recording devices configured to capture an image (e.g., a photo) and/or record a video stream. In some implementations, the image capture system 160 can include multiple cameras in communication with a central computing device such as a server, a personal computer, a data storage device (e.g., a NAS device, a database, etc.), and/or the like. In such implementations, the cameras can be autonomous (e.g., can capture image data without user prompting and/or input), and can each send image data to the central computing device (e.g., via a wired or wireless connection, a port, a serial bus, a network, and/or the like), which in turn, can store the image data in a memory and/or other data storage device. Moreover, the central computing device can be in communication with the host device 110 (e.g., via the network 105) and can be configured to send at least a portion of the image data to the host device 110. Although shown in FIG. 1 as being in communication with the host device 110 via the network 105, in other embodiments, such a central computing device can be included in, a part of, and/or otherwise coupled to the host device 110. In still other embodiments, the cameras can be in communication with the host device 110 (e.g., via the network 105) without such a central computing device.

In some implementations, the image capture system 160 can be associated with and/or owned by a venue or the like such as, for example, a sports arena, a theme park, a theater, and/or any other suitable venue. In other implementations, the image capture system 160 can be used in or at a venue but owned by a different entity (e.g., an entity licensed and/or otherwise authorized to use the image capture system 160 in or at the venue such as, for example, a television camera at a sporting event). In some instances, the image capture system 160 is configured to capture image data associated with and/or occurring at a venue and/or event. Similarly stated, the image capture system 160 is configured to capture image data within a predetermined, known, and/or given context. For example, in some instances, the image capture system 160 can include one or more image capture devices (e.g., cameras and/or video recorders) that are installed at an arena or the like and that are configured to capture image data associated with patrons, guests, performers, etc. at the arena. In this manner, the image capture system 160 is configured to capture image data within the context of the arena and/or an event occurring at the arena. Thus, the captured image data can be, for example, "contextual image data." That is to say, the image data is associated with contextual data.

In some embodiments, any number of client devices 140 such as smartphones, tablets, etc. can be in communication with the network 105 and the image capture system 160 can be formed by and/or otherwise include at least one camera or recorder included in at least one client device 140. In such embodiments, at least some of the client devices 140 can be in communication with the host device 110 and/or a central computing device associated with the venue (e.g., as described above).

Figure 2:
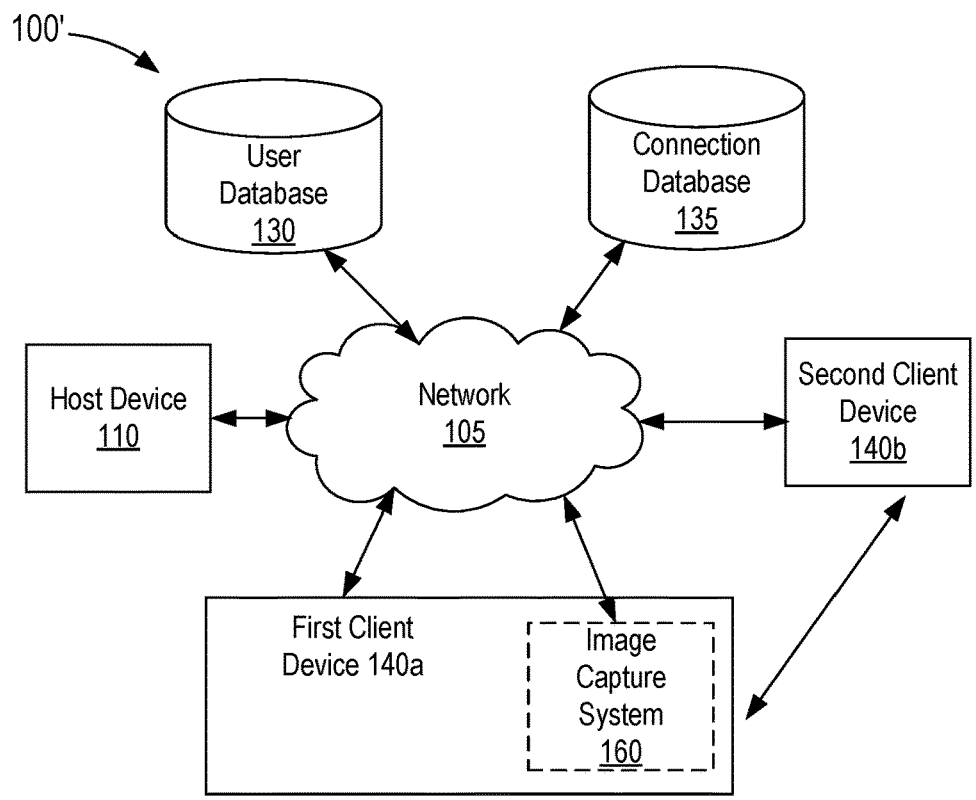
FIG. 2 is a schematic illustration of a recognition and notification system according to another embodiment.

For example, FIG. 2 illustrates an implementation of a system 100', in which a camera integrated into a first client device 140a (substantially similar to the client device 140 described above with reference to FIG. 1) can form and/or be part of at least a portion of the image capture system 160. In this manner, a user of the first client device 140a can manipulate the first client device 140a to capture a picture and/or video recording and in response, the first client device 140*a* can upload and/or otherwise send the picture (e.g., image data, photographic data, etc.) and/or video recording data to the host device 110 (e.g., in real-time or substantially real-time). In some instances, the picture and/or video recording data can be stored on the first client device 140*a* after the picture and/or video recording data is sent to the host device 110. That is to say, sending the picture and/or video recording data may not delete and/or remove the picture and/or video recording data from the first client device 140*a* (e.g., a copy of the data is sent to the host device 110). Thus, as shown in FIG. 2, the image capture system 160 need not be associated with a particular event and/or venue. In such instances, the user can manipulate the first client device 140*a* (e.g., an application of the first client device 140*a*) to capture user generated content (e.g., pictures, image data, photographic data, video stream data, etc.) via the camera and/or recording device (e.g., the image capture system 160) integrated into the first client device 140*a* while at the venue, event, and/or location. Thus, the camera and/or recording device of the first client device 140*a* can be at least a portion the image capture system 160 and can be associated with the venue, event, and/or location by virtue of the first client device 140*a* being physically present at the venue, event, and/or location.

In some instances, the host device 110 can receive the image data from the first client device 140*a* and based on data associated with the image, the first client device 140*a*, and/or any other suitable data stored, for example, in the user database 130, can determine that the user associated with the first client device 140*a* is at a particular venue and/or event (e.g., the venue where the image data was captured and/or the venue depicted in or by the image data). As described in further detail herein, in some instances, the host device 110 can then identify a set of people who share a connection with the user and can perform facial recognition analysis on the image data with respect to the people connected to the user to determine if any of the people connected to the user can be identified in the image data. The host device 110 can then define and send to the first client device 140*a* a notification that at least one person connected to the user is also at the venue and/or event, and/or is otherwise within a predetermined proximity from the user.

In other instances, however, the host device 110 can receive the image data from the first client device 140*a* and based on data associated with the image, a second client device 140*b*, and/or any other suitable data stored, for example, in the user database 130, can determine that a user associated with the second client device 140*b* is at a particular venue and/or event (e.g., the venue where the image data was captured and/or the venue depicted in or by the image data), as shown in FIG. 2. As described in further detail herein, in some instances, the host device 110 can then identify a set of people who share a connection with the user of the second client device 140*b* and can perform facial recognition analysis on the image data with respect to the people connected to the user of the second client device 140*b* to determine if any of the connected people can be identified in the image data. The host device 110 can then define and send to the second client device 140*b* a notification that at least one connected person is also at the venue and/or event, and/or is otherwise within a predetermined proximity from the user of the second electronic device 140*b*. Accordingly, the host device 110 can provide a notification to a user of the client device that captured the image data being analyzed (e.g., the first client device 140*a*) and/or can provide a notification to a user of a client device that did not capture the image data being analyzed (e.g., the second client device 140*b*). In other words, regardless of the source of the image data, a system (e.g., the system 100 (FIG. 1) and/or the system 100' (FIG. 2)) can be configured to provide any number of users with a notification that at least one person connected to that user is also at the venue and/or event, and/or is otherwise within a predetermined proximity from that user, as described in further detail herein.

An example of using the system 100 (FIG. 1) is provided below. In some instances, a user can manipulate the client device 140 and/or a PC or mobile application being executed on the client device 140 to establish and/or register a user account with the system 100. In some instances, registering with the system 100 can include, for example, sending data to the host device 110 (e.g., via the network 105), which in turn, can establish and/or define a user profile data structure associated with the user and stored, for example, in the user database 130. In some instances, the data sent to the host device 110 can include facial image data. For example, the user can manipulate the client device 140 to capture one or more images (or video streams) of his or her face (a "selfie") and to send signals associated with and/or representing the image data to the host device 110.

In some instances, the host device 110 can receive the image data (e.g., via the network 105 and the communication interface 112). Upon receipt, the analysis engine 118 can execute a set of instructions or code (e.g., stored in the analysis engine 118 and/or in the memory 114) associated with aggregating, analyzing, sorting, updating, parsing, and/or otherwise processing the image data. More specifically, the analysis engine 118 can perform any suitable facial recognition process and/or algorithm such as, for example, those described above. In some instances, the facial recognition process and/or algorithm can be an initial registering of facial image data associated with a user. In some instances, the host device 110 can use the facial image data as a template and/or data set against which data included in one or more images received from the image capture system 160 is compared, as described in further detail herein.

In some instances, the host device 110 can receive data associated with the user and/or one or more devices controlled by the user in addition to the image data. For example, in some instances, the host device 110 can receive data such as, for example, a picture, video recording and/or audio recording, personal and/or identifying information (e.g., name, age, sex, birthday, hobbies, etc.), calendar information, contact information (e.g., associated with the user and/or the user's friends, family, associates, social connections, professional connections, etc.), device information (e.g., a media access control (MAC) address, Internet Protocol (IP) address, etc.), location information (e.g., current location data and/or historical location data), social media information (e.g., profile information, user name, password, social and/or professional connection lists ("friends" lists), etc.), and/or any other suitable information or data. In some instances, the analysis engine 118 can aggregate the data associated with the user into an initial data set and can define a user profile data structure that includes the initial data set and any other suitable information or data. After defining the initial data set, the analysis engine 118 can send a signal to, for example, the database interface 120 indicative of an instruction to store the user profile data structure in the user database 130. In some instances, the host device 110 can send a confirmation to the client device 140 after the initial data is stored in the user database 130 (e.g., after the user is registered with the system 100). In addition, any of the user profile data and/or any portion of the initial data set can stored on the client device 140.

In some instances, the host device 110 and more particularly, the communication interface 112 (see FIG. 3) can receive image data (or video stream data) from the image capture system 160 either directly or indirectly, as described above. In some implementations, the analysis engine 118 can be configured to analyze and/or process the image data. In some instances, the analysis engine 118 can be configured to perform facial recognition analysis on the image data using any of the methods and/or techniques described herein. In addition, the analysis engine 118 can be configured to receive, analyze, and/or determine other information and/or data associated with the image data (e.g., contextual data). For example, in some instances, contextual information and/or data can include, for example, location, venue, time, coinciding event, and/or any other suitable contextual information. In some instances, the analysis engine 118 can be configured to match, aggregate, and/or otherwise associate at least a portion of the image data to the contextual data.

In some instances, the analysis engine 118 can be configured to analyze the image data and/or the contextual data relative to data associated with the user and/or the client device 140 (e.g., data in the user profile data structure stored in the user database 130, data received from the client device 140, and/or any other suitable data). In general, the analysis engine 118 can be configured to determine whether any data associated with the user and/or the client device 140 satisfies one or more criteria(ion) with respect to the image data and/or the contextual data. In some instances, the criteria(ion) can be associated with a determination that the user is present at the venue, event, and/or location associated with and/or shown in the image data.

By way of example, in some instances, the analysis engine 118 can analyze the image data and/or the contextual data to determine whether the user is shown in the image data. In such instances, the analysis engine 118 can be configured to perform a facial recognition analysis on the image data with respect to facial image data associated with any number of users (including the user associated with the client device 140). If the analysis engine 118 identifies the presence of the user associated with the client device 140 in the image data with a desired level of confidence (e.g., a confidence level above a threshold level as described above), the host device 110 can define, save, and/or register an indication that the user is at the venue, event, and/or location at which the image data was captured (e.g., a sporting event, concert, party, gathering, and/or any other suitable location). Moreover, in some instances, the analysis engine 118 can be configured to store in the user profile data structure any suitable data representing and/or associated with the confidence level and/or data representing and/or associated with the indication that the user is at the venue.

In other instances, the analysis engine 118 can analyze any suitable data associated with the user and/or the client device 140 to determine whether the user is present at the venue, event, and/or location. In such instances, the analysis engine 118 can receive and/or analyze location data associated with the client device 140, calendar data, check-in data, purchase data, and/or the like. In some instances, the client device 140 can automatically send to the host device 110 data indicative of and/or otherwise used (e.g., by the analysis engine 118) to determine a location of the client device 140. For example, the client device 140 can send the data at a pre-set or predetermined interval, when the client device 140 is within a proximity threshold of a given location, when the client device 140 enters a "geofence" (e.g., a virtual geographic boundary), and/or the like. As another example, the analysis engine 118 can determine that the user is present at the venue, event, and/or location in response to the client device 140 connecting to one or more networks (e.g., the network 105). As another example, the host device 110 can be configured to send a signal to the client device 140 (e.g., "ping" the client device 140) via a WiFi® protocol, a Bluetooth® protocol, an NFC protocol, a cellular network protocol, and/or the like. In such instances, if the host device 110 receives a response from the client device 140, the analysis engine 118 can determine that the user is at the venue, event, and/or location. In some instances, the host device 110 (e.g., the analysis engine 118) can analyze the image data and/or any suitable data associated with the user and/or the client device 140 to determine if the user is present at the venue, event, and/or location.

In response to the analysis engine 118 determining that the user is present at the venue, event, and/or location, the host device 110 can be configured to determine whether one or more people sharing a connection with the user is/are also present at the venue, event, and/or location. For example, in some instances, the database interface 120 can be configured to query and/or otherwise request from the connection database 135 data associated with and/or indicative of a list of people (or user accounts associated with people) who share a connection with the user. As described in detail above, the connection database 135 can be any suitable database and/or repository configured to store and/or at least temporarily retain data associated with any suitable connection service, social networking service, professional networking service, and/or the like. For example, in some instances, the connection database 135 can store user profile data structures associated with one or more social networking services (e.g., Facebook, Twitter, Snapchat, Instagram, LinkedIn, and/or any other social media). In other instances, the connection database 135 can be and/or can store data associated with, for example, the user's contact list stored in his or her smartphone. In still other instances, the connection database 135 can store data representing a connection and/or relationship between two or more people or between a user account of two or more people in any suitable manner.

In some instances, the database interface 120 can be configured to at least temporarily store (e.g., in or at the database interface 120, in the memory 114, and/or in the user database 130) the data resulting from querying and/or requesting data from the connection database 135. For example, the database interface 120 and/or any other suitable portion of the host device 110 can be configured to define and/or store data representing a set of people sharing a "connection" with the user (e.g., as described in detail above). In some instances, the database interface 120 and/or any other suitable portion of the host device 110 can be configured to define and/or store data representing a specific person when the connection to the user satisfies a criteria(ion). For example, in some instances, data representing a specific person can be defined and/or stored when the connection shared between the specific person and the user is a "first degree connection," as described in detail above. In such instances, the criteria(ion) can be a minimum degree of connection and/or can be a criteria(ion) that is satisfied only when a direct connection between the user and the specific person is defined. In some instances, when the degree of connection does not satisfy the criteria(ion) (e.g., in the case of a second degree connection, a third degree connection, etc.), the database interface 120 and/or any other suitable portion of the host device 110 can be configured to exclude that person from the set of people connected to the user.

While the database interface 120 is described as not including data associated with a person who shares an indirect connection with a user (e.g., a second degree connection), in other instances, the host device 110 can be configured to suggest a relationship with one or more indirect connections. For example, in some instances, the notification engine 122 and/or any other suitable portion of the host device 110 can define and send to the client device 140 a notification indicative of an opportunity to determine if additional people the user may know are present at the venue, event, and/or location. In some instances, the database interface 120 can store, for example, identifying data associated with the second-degree connection. In some instances, the analysis engine 118 can be configured to ignore the data associated with the second degree connection when performing facial recognition analysis on the image data unless the user provides an input indicating that he or she would like to increase their connections, and/or the like.

In other instances, a criteria(ion) can be associated with a user profile and/or user data being set as public, accessible, and/or otherwise not private. For example, in some instances, a person connected to the user may elect (e.g., via a user input at or on the client device 140) to limit or prevent sharing of his or her user data, images, and/or videos. In such instances, the user profile and/or user data stored in the connection database 135 associated with the person can include an indication that the user data and/or the user profile is private. In this manner, the criteria(ion) of public and/or accessible user data is not satisfied and, as such, the database interface 120 and/or any other suitable portion of the host device 110 does not add the person (or the user data associated with the person) to the set of connections.

The database interface 120 can also be configured to query the connection database 135 for facial image data associated with each person from the set of people connected to the user. In some instances, the facial image data can be, for example, a profile picture associated with a user profile of each person from the set of people. In some instances, the facial image data can be facial recognition data and/or otherwise previously analyzed facial image data. For example, in some instances, a connection service (e.g., social networking service) can store a data set resulting from performing facial recognition analysis on any number of images uploaded to and/or otherwise associated with a user profile. In some instances, the facial recognition data can reduce resource consumption of the system 100 because the facial recognition data associated with a person connected to the user has already been defined and/or generated.

After defining and/or determining the set of people connected to the user, the analysis engine 118 and/or any other suitable portion of the host device 110 can be configured to perform and/or execute facial recognition analysis on the image data received from the image capture system 160. In some instances, the facial recognition analysis can be any of those described herein. As such, the analysis engine 118 can be configured to determine whether one or more person from the set of people connected to the user is identifiable in the image data received from the image capture system 160. Moreover, the analysis engine 118 can define a confidence score and/or level associated with a positive identification. If the confidence score and/or level satisfies a criteria(ion) such as, for example, is above a minimum threshold level, the analysis engine 118 can define, save, and/or register an indication that the person is present at the venue, event, and/or location, as described in detail above. In some instances, the analysis engine 118 can be configured to define an analyzed data set based on the facial recognition analysis and/or otherwise associated with the at least one image. In some instances, the host device 110 can be configured to store the analyzed data set in the memory 114 of the host device 110, the databases 130 and/or 135, and/or a combination thereof.

In some instances, the analysis engine 118 and/or any other suitable portion of the host device 120 can perform one or more pre-processing and/or pre-sorting procedures prior to performing the facial recognition process (just described). For example, in some embodiments, the analysis engine 118 can analyze the contextual data associated with and/or included in the image data and can compare the contextual data to user data associated with each person in the set of connections. In some instances, the user data associated with each person in the set of connections can include, for example, calendar data, location data (e.g., GPS data of an associated electronic device), social media data, network location and/or data (e.g., via NFC verification, Bluetooth verification, WiFi verification, cellular triangulation, cognitive network switching and/or protocols, etc.), preference data, and/or the like. If, for example, the user data does not satisfy a criteria(ion), the analysis engine 118 can define an indication that the data associated with that person can be excluded from, for example, the facial recognition process. In this manner, the pre-processing and/or pre-sorting can reduce an amount of processing load or the like during the facial recognition process.

In response to the analysis engine 118 defining, saving, and/or registering the indication that the person having a connection is present at the venue, event, and/or location, the notification engine 122 can define a notification indicative of the person's presence at the same venue, substantially the same location, or within a predetermined proximity. After the notification is defined, the notification engine 122 can send the notification and/or data representing the notification to the client device 140 (e.g., via the communication interface 112 and the network 105). The notification engine 122 can be configured to send the notification and/or the instance of the notification via any suitable modality. For example, in some instances, the notification engine 122 can send a notification and/or an instance of the notification via e-mail, short message service (SMS), multimedia message service (MMS), NFC and/or Bluetooth® communication, posted to a social media platform (e.g., posted to and/or presented by Facebook, Twitter, Instagram, etc.) and/or as a notification with a native application associated with the social media platform, and/or the like. In some instances, the modality for sending the notification can be based on a user preference set, for example, during registration and/or any time thereafter.

In some instances, the notification engine 122 can be configured to send a notification and/or data representing and/or associated with the notification to one or more client devices associated with the identified person having a connection with the user. In some instances, the notification and/or data representing the notification sent to the client device associated with the identified person can be substantially similar to the notification and/or the data representing the notification sent to the client device associated with the user. For example, such a notification can be a substantially real-time notification intended to notify the identified person that the user is within the same venue as the identified person, substantially the same location as the identified person, and/or within a predetermined proximity of the identified person. The notification sent to the user (e.g., a first notification) and the notification sent to the identified person (e.g., a second notification) can be sent at substantially the same time or can be sent at different times. Said another way, in some implementations, the notification engine 122 can send the first notification to the user when the identified person is within a first predetermined proximity of the user and can send the second notification to the identified person when the user is within a second predetermined proximity of the identified user (e.g., a proximity closer than the first predetermined proximity, a proximity further than the first predetermined proximity, or a proximity substantially equal to the first predetermined proximity).

In some instances, the notification and/or the data representing the notification sent to the identified person can be and/or can include any other data. For example, the notification and/or the data representing the notification can also include an invitation to join, register, and/or otherwise become associated with the system 100. In some instances, the notification and/or the data representing the notification sent to the identified person can include data and/or can include any number of additional notifications indicative of one or more people who share a connection with both the user and the identified person having a connection with the user.

As described above, the signal sent to the client device 140 can be indicative of and/or can include data that is indicative of an instruction to cause the client device 140 to present the notification and/or an instance of the notification via, for example, the output device 148, as described above. In some instances, the notification and/or data included in or with the notification can include one or more portions or instances of the image data depicting the person connected to the user. In other instances, the notification need not included image data. In some instances, the analysis engine 118 can be configured to determine a specific location of the person at the venue (e.g., relative to the user) and can include information associated with the person's specific location in the notification and/or data sent with the notification. For example, in some instances, the user and the person sharing a connection with the user may be at an arena, theater, sporting event, party, wedding, etc. and a notification may include, for example, a section number, table number, seat number, and/or any other data pinpointing or identifying a position or location of the person within the venue and/or at the event.

Although the analysis engine 118, the database interface 120, and the notification engine 122 are described above as being stored and/or executed in the host device 110, in other embodiments, any of the engines, modules, components, and/or the like can be stored and/or executed in, for example, the client device 140 and/or the image capture system 160. For example, in some embodiments, the client device 140 can include, define, and/or store at least a portion of a notification engine (e.g., as a native application). The notification engine can be substantially similar to or the same as the notification engine 122 of the host device 110. In some such implementations, the notification engine of the client device 140 can replace at least a portion of the function of the notification engine 122 otherwise included and/or executed in the host device 110. Thus, the notification engine of the client device 140 can receive, for example, an indication that one or more people connected to a user of the client device 140 are present at a venue and/or are otherwise within a predetermined proximity of the user.

Thus, as just described, the system 100 can perform, in substantially real-time, facial recognition analysis on image data and can provide a user with one or more notifications when a result of the facial recognition analysis indicates that a person sharing a connection with the user is identified in the analyzed image. Similarly, the system 100' (FIG. 2) can be implemented and/or used in a substantially similar manner when the image capture system 160 is at least partially included in a client device (e.g., the client device 140a).

Figure 5:
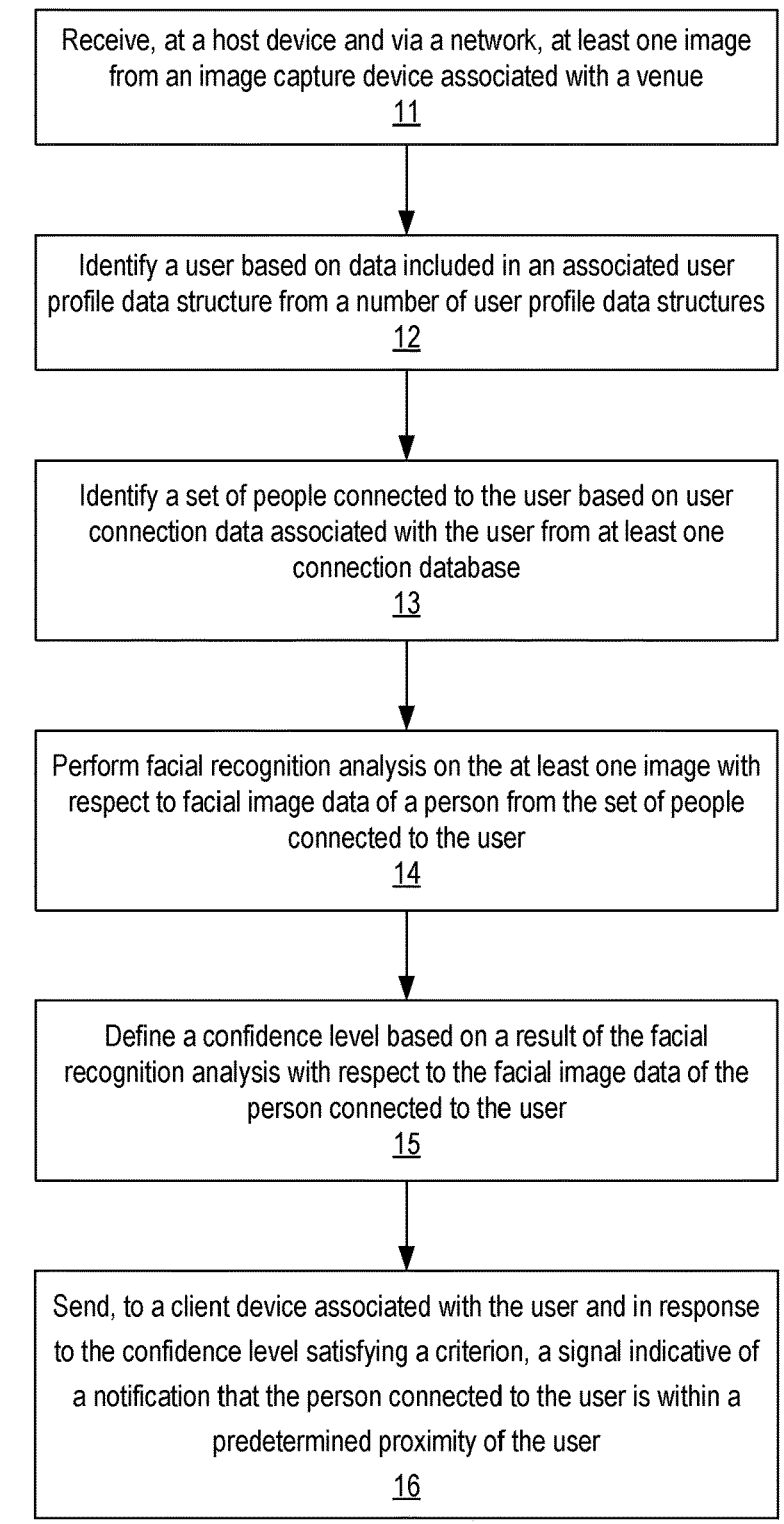
FIG. 5 is a flowchart illustrating a method of using a recognition and notification system according to an embodiment.

FIG. 5 is a flowchart illustrating a method 10 of using a recognition and notification system according to an embodiment. The recognition and notification system (also referred to herein as "system") can be any suitable system such as, for example, the system 100 described above. As such, the system can be configured to perform, in substantially real-time, facial recognition analysis on one or more images and provide a user with one or more notifications when a result of the facial recognition analysis indicates that a person sharing a connection with the user is identified in the analyzed one or more images.

The method 10 includes receiving, at a host device and via a network, at least one image from an image capture device associated with a venue, at 11. The host device can be any suitable device(s) configured to perform facial recognition analysis and/or configured to provide one or more notifications associated with the results of a facial recognition analysis. The network can be any suitable network(s) configured to establish communication between two or more electronic devices. The image capture device can be any suitable device(s) configured to capture one or more images and/or configured to record one or more video streams. In some implementations, the host device, the network, and the image capture device can be substantially similar to and/or the same as the host device 110, the network, 105, and the image capture device 160 described above with reference to FIGS. 1-3.

A user is identified based on data included in an associated user profile data structure from a number of user profile data structures, at 12. In some instances, the host device can be configured to identify one or more users who are present at the venue. The user can be, for example, a user registered with the system (e.g., the system 100). In some implementations, each user can have and/or can be associated with a user profile data structure that is stored, for example, in a database (e.g., the user database 130). The user profile data structure can include any suitable data associated with the user and/or one or more client devices controlled by the user. In some instances, the user profile data structure can include facial image data and the host device can identify the presence of the user at the venue based on performing facial recognition analysis on one or more images received from the image capture device relative to facial image data included in at least some of the user profile data structures. In other instances, the user profile data structure(s) can include any suitable data (e.g., data not used in facial recognition analysis) that the host device can use to identify the presence of a user at the venue.

A set of people connected to the user is identified based on user connection data associated with the user from at least one connection database, at 13. In some implementations, the connection database can be substantially similar to the connection database 135 described above with reference to FIGS. 1 and 2. For example, in some implementations, the connection database can be a database and/or any other storage medium associated with and/or controlled by a social networking service, a professional networking service, and/or the like. In such implementations, the database and/or other storage medium can include data representing connections between people (or user profiles of people) on the social networking service, professional networking service, and/or the like. For example, a social connection can be defined when two people and/or users are "Friends" and/or are otherwise connected, as described above. In other implementations, the connection database can be any suitable storage medium or structure configured to store data associated with relationships between people and/or users. In some instances, the host device can query the connection database for data representing the user's connections (e.g., social connections, professional connections, and/or the like) and can save and/or store the data and/or at least a portion of the data in, for example, the user database and/or the like. In some instances, the host device can define one or more criteria(ion) associated with a level or degree of connection and/or any other suitable criteria(ion).

After identifying the set of people connected to the user, facial recognition analysis is performed on the at least one image with respect to facial image data of a person from the set of people connected to the user, at 14. The facial image data can be accessible, for example, via the at least one connection database. For example, in some instances, the facial image data can be included in a user's public profile. In other instances, a person connected to the user can have a user profile that is private and/or that otherwise limits access to data associated with that person. In such instances, the facial recognition analysis is not performed relative to that person from the set of people connected to the user (e.g., the person and/or data associated with the person does not satisfy a criterion such as, for example, a public profile). In some instances, the host device can be configured to define an analyzed data set based on the facial recognition analysis and/or otherwise associated with the at least one image. In some instances, the host device can be configured to store the analyzed data set in the memory of the host device and/or one or more databases.

A confidence level is defined based on a result of the facial recognition analysis with respect to the facial image data of the person from the set of people connected to the user, at 15. The confidence level can be, for example, a measure of confidence associated with the accuracy of a positive identification of the person in the at least one image. The confidence level can be represented in any suitable manner and/or by any suitable data. For example, in some instances, a confidence level can be represented and/or defined as a percentage, where 100% is indicative of complete confidence in the result of the facial recognition analysis. Moreover, in some instances, the host device can determine that the person connected to the user is present at the same venue as the user and/or is otherwise within a predetermined proximity of the user when the person is identified in the at least one image with a desired confidence level and/or a confidence level that satisfies the criterion.

In response to the confidence level satisfying a criterion, a signal indicative of a notification that the person is within a predetermined proximity of the user is sent via the network to a client device associated with the user, at 16. In some implementations, the criterion can be, for example, threshold (e.g., minimum) confidence level. For example, in some instances, a threshold confidence level can be 50%, 60%, 70%, 80%, 90%, 95%, 99%, and/or any other suitable confidence level. In some implementations, the threshold confidence level can be defined by the user and/or can otherwise be based on a user preference. In other implementations, the threshold confidence level can be predetermined (e.g., by the host device).

As described in detail above with reference to the system 100, when the confidence level associated with identifying the person in the at least one image is greater than the threshold confidence level, the host device can be configured to define a notification and can send to the client device associated with the user a signal indicative of a instruction for the client device to present a notification to the user (e.g., via an output device such as the output device 148 of the client device 140). In other implementations, the client device can be configured to define the notification (e.g., via a native application and/or the like). As such, the method 10 can be used, for example, to (1) perform, in substantially real-time, facial recognition analysis on one or more images and (2) provide a user with one or more substantially real-time notifications when a result of the facial recognition analysis indicates that a person sharing a connection with the user is identified in the analyzed one or more images.

While various embodiments have been described above, it should be understood that they have been presented by way of example only, and not limitation. While specific examples have been particularly described above, the embodiments and methods described herein can be used in any suitable manner. For example, while the system 100 is described above as capturing and analyzing one or more images (or video streams) at a sporting event, in other embodiments, the systems and/or methods described herein can be used to identify an individual using, for example, facial recognition and/or video analytics in any suitable setting, venue, arena, event, etc. such as a concert, a rally, a graduation, a party, a shopping mall, a place of business, a restaurant, and/or any other suitable place. As another example, while the system 100 is described above as performing facial recognition analysis on one or more images and/or video streams, in other implementations, a host device can be configured to any suitable source of audio to identify a user at a venue and/or one or more people connected to the user. In some instances, audio or voice analysis can be performed in addition to the facial recognition analysis described herein. In other instances, audio or voice analysis can be performed instead of or as an alternative to the facial recognition analysis described herein.

While various systems and/or methods have been described herein as identifying a registered user at a given venue or location and identifying one or more people sharing a connection with the identified user who are also at the given venue or location, in other implementations, a user need not be registered with a system in order to be identified. Moreover, a person identified as sharing a connection with a given user can be a user registered with the system or a person not registered with the system. In some instances, a host device can be configured to send to a client or user device associated with a non-registered person a signal indicative of an invitation to register with a system and/or the host device.

While various systems and/or methods have been described herein as identifying a user at a given venue or location, identifying one or more people sharing a connection with the identified user who is/are also at the given venue or location, and sending, in substantially real-time, a signal to the user indicative of a notification that an identified person is also at the given venue or location (or otherwise within a predetermined proximity), it should be understood that the systems and/or methods are not intended to be limited to sending a single notification or a notification including data associated with a single identified person. For example, in some instances, any of the systems and/or methods described herein can be configured to send multiple notifications to a client device associated with the user, where each individual notification is associated with a different identified person. In other instances, any of the systems and/or methods described herein can be configured to send a single notification to a client device associated with the user, where the notification includes a list of one or more identified people (e.g., one identified person, two identified people, three identified people, four identified people, five identified people, ten identified people, twenty identified people, fifty identify people, one hundred identified people, or more, or any number of identified people therebetween).

While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above. For example, while the method 10 is described above as identifying the user (at 12), identifying the set of people connected to the user (at 13), and performing facial recognition analysis with respect to facial image data of one or more people from the set of people connected to the user (at 14), in some instances, these events and/or procedures may be performed concurrently and/or in any suitable order or sequence. For example, in some instances, a method could include identifying a user as well as any number of other people who may or may not be connected to the user in a concurrent or parallel process. Accordingly, in such instances, a host device can identify connections between an identified user and any number of identified people after performing facial recognition analysis. In other instances, any of the steps, events, and/or processes included in the method 10 can similarly be performed in concurrent or parallel processes and/or in any other suitable order or sequence.

While specific methods of facial recognition have been described above according to specific embodiments, in some instances, any of the methods of facial recognition can be combined, augmented, enhanced, and/or otherwise collectively performed on a set of facial recognition data. For example, in some instances, a method of facial recognition can include analyzing facial recognition data using Eigenvectors, Eigenfaces, and/or other 2-D analysis, as well as any suitable 3-D analysis such as, for example, 3-D reconstruction of multiple 2-D images. In some instances, the use of a 2-D analysis method and a 3-D analysis method can, for example, yield more accurate results with less load on resources (e.g., processing devices) than would otherwise result from only a 3-D analysis or only a 2-D analysis. In some instances, facial recognition can be performed via convolutional neural networks (CNN) and/or via CNN in combination with any suitable 2-D analysis methods and/or 3-D analysis methods. Moreover, the use of multiple analysis methods can be used, for example, for redundancy, error checking, load balancing, and/or the like. In some instances, the use of multiple analysis methods can allow a system to selectively analyze a facial recognition data set based at least in part on specific data included therein.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed:

1. An apparatus, comprising:
   a memory;
   a communication interface in communication with the memory and configured to communicate via a network; and
   a processor in communication with the memory and the communication interface, the processor configured to receive, via the network and the communication interface, at least one image from an image capture device, the processor configured to analyze the at least one image via facial recognition to define an analyzed data set associated with the at least one image,
   the processor configured to (1) identify a user based on data included in an associated user profile data structure from a plurality of user profile data structures stored in the memory, (2) identify a set of people connected to the user based on user connection data associated with the user from at least one connection database, (3) compare the analyzed data set to facial image data of a person from the set of people connected to the user, the facial image data of the person being accessible via the at least one connection database, and (4) define a confidence level based on comparing the analyzed data set to the facial image data of the person from the set of people connected to the user, and the processor configured to send a signal via the network to a client device associated with the user when the confidence level satisfies a criterion, the signal being indicative of a notification that the person from the set of people connected to the user is within a predetermined proximity of the user.

2. The apparatus of claim 1, wherein the processor is configured to identify the user based on at least one of location data, check-in data, calendar data, or image data included in the user profile data structure from the plurality of user profile data structures.

3. The apparatus of claim 1, wherein the processor is configured to identify the user as a result of comparing the analyzed data set to facial image data included in the user profile data structure from the plurality of user profile data structures.

4. The apparatus of claim 1, wherein the confidence level is a first confidence level and the criterion is a first criterion, the processor is configured to (1) compare the analyzed data set to facial image data included in each user profile data structure from the plurality of user profile data structures and (2) define a second confidence level based on comparing the analyzed data set to the facial image data included in the user profile data structure from the plurality of user profile data structures, and the processor configured to identify the user associated with the user profile data structure when the second confidence level satisfies a second criterion.

5. The apparatus of claim 1, wherein the image capture device is associated with a venue and is not an image capture device controlled by a user from a plurality of users, each user from the plurality of users is associated with a different user profile data structure from the plurality of user profile data structures.

6. The apparatus of claim 1, wherein the user is a first user present at a venue, the image capture device is an image capture device controlled by a second user present at the venue, different from the first user.

7. The apparatus of claim 1, wherein the notification that the person from the set of people connected to the user is within the predetermined proximity of the user is a substantially real-time notification.

8. The apparatus of claim 1, wherein the user connection data associated with the user from the at least one connection database is user connection data from a user profile associated with the user on at least one social networking service.

9. The apparatus of claim 1, wherein the user connection data associated with the user from the at least one connection database is user connection data from a user profile associated with the user on at least one social networking service, each person included in the set of people is connected to the user via a first-degree connection on the at least one social networking service.

10. An apparatus, comprising:
a memory;
a communication interface in communication with the memory and configured to communicate via a network; and
a processor in communication with the memory and the communication interface, the processor configured to receive, via the network and the communication interface, at least one image from an image capture device associated with a venue, the processor configured to identify a user is present at the venue based on data included in an associated user profile data structure from a plurality of user profile data structures stored in the memory, the processor configured to (1) identify a set of people connected to the user based on user connection data associated with the user from at least one connection database, (2) analyze the at least one image via facial recognition with respect to facial image data of a person from the set of people connected to the user, the facial image data of the person being accessible via the at least one connection database, and (3) define a confidence level associated with identifying the person from the set of people connected to the user in the at least one image, and the processor configured to send a signal via the network to a client device associated with the user when the confidence level satisfies a criterion, the signal being indicative of a notification that the person from the set of people is present at the venue.

11. The apparatus of claim 10, wherein the processor is configured to identify the user based on at least one of location data, check-in data, calendar data, or image data included in the user profile data structure from the plurality of user profile data structures.

12. The apparatus of claim 10, wherein the image capture device associated with the venue and is not an image capture device controlled by a user from a plurality of users, each user from the plurality of users is associated with a different user profile data structure from the plurality of user profile data structures.

13. The apparatus of claim 10, wherein the user is a first user present at the venue, the image capture device is an image capture device controlled by a second user present at the venue, different from the first user.

14. The apparatus of claim 10, wherein the notification that the person from the set of people connected to the user is present at the venue is a substantially real-time notification.

15. The apparatus of claim 10, wherein the user connection data associated with the user from the at least one connection database is user connection data from a user profile associated with the user on at least one social networking service.

16. The apparatus of claim 10, wherein the user connection data associated with the user from the at least one connection database is user connection data from a user profile associated with the user on at least one social networking service, each person included in the set of people is connected to the user via a first-degree connection on the at least one social networking service.

17. A method, comprising:
receiving, at a host device and via a network, at least one image from an image capture device associated with a venue;
identifying a user based on data included in an associated user profile data structure from a plurality of user profile data structures;
identifying a set of people connected to the user based on user connection data associated with the user from at least one connection database;
performing facial recognition analysis on the at least one image with respect to facial image data of a person from the set of people connected to the user, the facial image data being accessible via the at least one connection database;

defining a confidence level based on a result of the facial recognition analysis with respect to the facial image data of the person from the set of people connected to the user; and sending, in response to the confidence level satisfying a criterion, a signal via the network to a client device associated with the user, the signal being indicative of a notification that the person from the set of people connected to the user is within a predetermined proximity of the user.

18. The method of claim 17, wherein the identifying the set of people connected to the user based on the user connection data associated with the user from the at least one connection database includes identifying the set of people connected to the user based on user connection data from a user profile associated with the user on at least one social networking service.

19. The method of claim 17, wherein the identifying the set of people connected to the user based on the user connection data associated with the user from the at least one connection database includes identifying the set of people connected to the user based on user connection data from a user profile associated with the user on at least one social networking service, each person included in the set of people is connected to the user via a first-degree connection on the at least one social networking service.

20. The method of claim 17, wherein the user is from a plurality of users, each user from the plurality of users is associated with a different user profile data structure from the plurality of user profile data structures, the receiving the at least one image from the image capture device associated with the venue includes receiving the at least one image from an image capture device that is not controlled by a user from the plurality of users.

21. The method of claim 17, wherein the user is a first user present at the venue, the receiving the at least one image from the image capture device associated with the venue includes receiving the at least one image from an image capture device associated with a second user present at the venue, the second user is different from the first user.

22. The method of claim 17, wherein the identifying the user based on data included in the associated user profile data structure from the plurality of user profile data structures includes identifying the user based on at least one of location data, check-in data, calendar data, or image data included in the user profile data structure from the plurality of user profile data structures.

23. The method of claim 17, wherein the confidence level is a first confidence level and the criterion is a first criterion, the method further comprising:

performing facial recognition analysis on the at least one image with respect to facial image data included in each user profile data structure from the plurality of user profile data structures;

defining a second confidence level based on the facial recognition analysis on the at least one image with respect to the facial image data included in the user profile data structure from the plurality of user profile data structures; and storing data representing the second confidence level in the user profile data structure from the plurality of user profile data structures.

24. The method of claim 17, wherein the confidence level is a first confidence level and the criterion is a first criterion, the method further comprising:

performing facial recognition analysis on the at least one image with respect to facial image data included in each user profile data structure from the plurality of user profile data structures;

defining a second confidence level based on the facial recognition analysis on the at least one image with respect to the facial image data included in the user profile data structure from the plurality of user profile data structures; and storing data representing the second confidence level in the user profile data structure from the plurality of user profile data structures, the identifying the user based on data included in the user profile data structure from the plurality of user profile data structures includes identifying the user when the data representing the second confidence level satisfies a second criterion.

25. The method of claim 17, further comprising:

sending, in response to the confidence level satisfying a criterion, a signal via the network to a client device associated with the person from the set of people connected to the user, the signal being indicative of a notification that the user is within a predetermined proximity of the person from the set of people connected to the user.

26. The method of claim 17, wherein the notification that the person from the set of people connected to the user is within the predetermined proximity of the user is a substantially real-time notification.

27. The method of claim 17, wherein the notification that the person from the set of people connected to the user is within the predetermined proximity of the user is a first substantially real-time notification, the method further comprising:

sending, in response to the confidence level satisfying a criterion, a second substantially real-time notification via the network to a client device associated with the person from the set of people connected to the user, the second substantially real-time notification being an indication that the user is within a predetermined proximity of the person from the set of people connected to the user.

* * * * *